US011774541B2

(12) United States Patent
Gupta et al.

(10) Patent No.: US 11,774,541 B2
(45) Date of Patent: Oct. 3, 2023

(54) METHODS AND APPARATUS FOR COMBINED SIGNALING FOR SIDELINK ASSISTED POSITIONING

(71) Applicant: QUALCOMM Incorporated, San Diego, CA (US)

(72) Inventors: Piyush Gupta, Bridgewater, NJ (US); Srinivas Yerramalli, San Diego, CA (US); Rajat Prakash, San Diego, CA (US); Xiaoxia Zhang, San Diego, CA (US); Junyi Li, Fairless Hills, PA (US); Xiaojie Wang, Hillsborough, NJ (US); Marwen Zorgui, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 53 days.

(21) Appl. No.: 17/489,547

(22) Filed: Sep. 29, 2021

(65) Prior Publication Data

US 2023/0101624 A1 Mar. 30, 2023

(51) Int. Cl.
*G01S 5/00* (2006.01)
*H04L 5/00* (2006.01)
(Continued)

(52) U.S. Cl.
CPC .......... *G01S 5/0036* (2013.01); *H04L 5/0051* (2013.01); *H04W 24/10* (2013.01); *H04W 64/006* (2013.01)

(58) Field of Classification Search
CPC .... G01S 5/0036; H04L 5/0051; H04W 24/10; H04W 64/006
See application file for complete search history.

(56) References Cited

U.S. PATENT DOCUMENTS

2016/0192146 A1\* 6/2016 Hooli .................... H04W 4/023
455/404.2
2019/0260487 A1\* 8/2019 Kazmi ................. H04B 17/382
(Continued)

FOREIGN PATENT DOCUMENTS

WO WO-2016048509 A1 3/2016
WO WO-2022041130 3/2022

OTHER PUBLICATIONS

Intel Corporation: "Analysis of Anchored and Non-Anchored D2D Aided Positioning", 3GPP TSG RAN WG1 Meeting #82, R1-153991 Intel—D2D Trilateration, 3rd Generation Partnership Project, Mobile Competence Centre, 650, Route Des Lucioles, F-06921 Sophia-Antipolis Cedex, France, vol. RAN WG1, No. Beijing, China, Aug. 24, 2015-Aug. 28, 2015, Aug. 23, 2015, pp. 1-6, XP051001398, paragraphs [2Usageof2DAir]—[InterfaceforUserPositioning], figures 1, 2.

(Continued)

*Primary Examiner* — Siu M Lee
(74) *Attorney, Agent, or Firm* — Procopio, Hargreaves & Savitch LLP

(57) ABSTRACT

Positioning of one or more user equipments (UEs) is performed using broadcast common sounding reference signals (SRS) resources for positioning. The common SRS that is broadcast by a UE is received and measured by one or more base stations and one or more other UEs. The other UEs may have known positions and may server as anchor nodes for positioning. The other UEs may have known positions and may serve as a positioning (anchor) node or may have unknown positions and may be jointly positioned with the target UE. During joint positioning, each of the other UEs may similarly broadcast a common set of SRS that is received and measured by the base stations and other UEs for positioning. An angular measurement of the SRS broad- (Continued)

cast by one or more UEs may be measured and used to resolve mirror symmetry in positioning solutions.

34 Claims, 12 Drawing Sheets

(51) Int. Cl.
*H04W 24/10* (2009.01)
*H04W 64/00* (2009.01)

(56) References Cited

U.S. PATENT DOCUMENTS

| | | |
|---|---|---|
| 2019/0297673 A1 | 9/2019 | Xue et al. |
| 2021/0297206 A1* | 9/2021 | Manolakos ............ H04W 76/14 |
| 2022/0295442 A1* | 9/2022 | Goyal ................... H04W 64/00 |
| 2022/0308153 A1* | 9/2022 | Fakoorian ............. H04W 64/00 |
| 2022/0321293 A1 | 10/2022 | Ren |
| 2022/0407639 A1* | 12/2022 | Ren ....................... H04W 64/00 |

OTHER PUBLICATIONS

International Search Report and Written Opinion—PCT/US2022/042251—ISA/EPO—dated Jan. 5, 2023.

\* cited by examiner

US 11,774,541 B2

METHODS AND APPARATUS FOR COMBINED SIGNALING FOR SIDELINK ASSISTED POSITIONING

BACKGROUND

Field

The subject matter disclosed herein relates to wireless communications systems, and more particularly to systems, methods, and devices that support positioning.

Relevant Background

Wireless communication systems are widely deployed to provide various telecommunication services such as telephony, video, data, messaging, positioning, and broadcasts. Typical wireless communication systems may employ multiple-access technologies capable of supporting communication with multiple users by sharing available system resources (e.g., bandwidth, transmit power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit). Additionally, UEs may communicate directly with each other using sidelink channels.

The location of UE may be useful or essential to a number of applications including emergency calls, navigation, direction finding, asset tracking and Internet service. The location of a UE may be estimated based on information gathered from various systems. In a cellular network implemented according to LTE or 5G NR, for example, a base station may send downlink reference signals with which positioning measurements are performed by a UE and/or the UE may send uplink reference signals with which positioning measurements are performed by the base stations. Additionally, sidelink reference signals may be transmitted by UEs and positioning measurements performed by a UE. The UE may compute an estimate of its own location using the positioning measurements in UE-based positioning or may send the positioning measurements to a network entity, e.g., location server, which may compute the UE location based on the positioning measurements in UE-assisted positioning.

It may be desirable for positioning improvements implemented in newer technologies, such as 5G NR, to assist in positioning of multiple UEs more efficiently.

SUMMARY

Positioning of one or more user equipments (UEs) is performed using broadcast common sounding reference signals (SRS) resources for positioning. The common SRS that is broadcast by a UE is received and measured by one or more base stations and one or more other UEs. The other UEs may have known positions and may server as anchor nodes for positioning. The other UEs may have known positions and may serve as a positioning (anchor) node or may have unknown positions and may be jointly positioned with the target UE. During joint positioning, each of the other UEs may similarly broadcast a common set of SRS that is received and measured by the base stations and other UEs for positioning. An angular measurement of the SRS broadcast by one or more UEs may be measured and used to resolve mirror symmetry in positioning solutions.

In one implementations, a method performed by a target user equipment (UE) for supporting positioning of the target UE, includes receiving a sounding reference signal (SRS) configuration for broadcasting a common SRS resource for positioning to at least one base station and at least one assisting UE, wherein the at least one assisting UE are configured with the SRS configuration to receive the common SRS resource; and broadcasting the common sounding reference signal (SRS) resource to each of the at least one base station and the at least one assisting UE, wherein the at least one base station generates a first measurement report and sends the first measurement report to a positioning entity and the at least one assisting UE generates a second measurement report and sends the second measurement report to the positioning entity, wherein a position of the target UE is determined based at least on at least the first measurement report and the second measurement report.

In one implementations, a target user equipment (UE) configured for supporting positioning of the target UE, includes a wireless transceiver configured to communicate with entities in a wireless network; at least one memory; and at least one processor coupled to the wireless transceiver and the at least one memory, wherein the at least one processor is configured to: receive, via the wireless transceiver, a sounding reference signal (SRS) configuration for broadcasting a common SRS resource for positioning to at least one base station and at least one assisting UE, wherein the at least one assisting UE are configured with the SRS configuration to receive the common SRS resource; and broadcast, via the wireless transceiver, the common sounding reference signal (SRS) resource to each of the at least one base station and the at least one assisting UE, wherein the at least one base station generates a first measurement report and sends the first measurement report to a positioning entity and the at least one assisting UE generates a second measurement report and sends the second measurement report to the positioning entity, wherein a position of the target UE is determined based at least on at least the first measurement report and the second measurement report.

In one implementations, a target user equipment (UE) configured for supporting positioning of the target UE, includes means for receiving a sounding reference signal (SRS) configuration for broadcasting a common SRS resource for positioning to at least one base station and at least one assisting UE, wherein the at least one assisting UE are configured with the SRS configuration to receive the common SRS resource; and means for broadcasting the common sounding reference signal (SRS) resource to each of the at least one base station and the at least one assisting UE, wherein the at least one base station generates a first measurement report and sends the first measurement report to a positioning entity and the at least one assisting UE generates a second measurement report and sends the second measurement report to the positioning entity, wherein a position of the target UE is determined based at least on at least the first measurement report and the second measurement report.

In one implementations, a non-transitory storage medium including program code stored thereon, the program code is operable to configure at least one processor in a target user equipment (UE) for supporting positioning of the target UE, the program code comprising instructions to: receive a sounding reference signal (SRS) configuration for broadcasting a common SRS resource for positioning to at least one base station and at least one assisting UE, wherein the at least one assisting UE are configured with the SRS configuration to receive the common SRS resource; and broadcast the common sounding reference signal (SRS) resource to each of the at least one base station and the at least one assisting UE, wherein the at least one base station generates a first measurement report and sends the first measurement report to a positioning entity and the at least one assisting UE generates a second measurement report and sends the second measurement report to the positioning entity, wherein the position of the target UE is determined based at least on at least the first measurement report and the second measurement report.

In one implementations, a method performed by a user equipment (UE) for supporting positioning of a target UE, includes receiving a common sounding reference signal (SRS) resource broadcast by the target UE for receipt by the UE and at least one base station; generating a first positioning measurement based on the common SRS resource; and reporting the first positioning measurement to a positioning entity.

In one implementations, a user equipment (UE) configured for supporting positioning of a target UE, includes a wireless transceiver configured to communicate with entities in a wireless network; at least one memory; and at least one processor coupled to the wireless transceiver and the at least one memory, wherein the at least one processor is configured to: receive, via the wireless transceiver, a common sounding reference signal (SRS) resource broadcast by the target UE for receipt by the UE and at least one base station; generate a first positioning measurement based on the common SRS resource; and report, via the wireless transceiver, the first positioning measurement to a positioning entity.

In one implementations, a user equipment (UE) configured for supporting positioning of a target UE, includes means for receive a common sounding reference signal (SRS) resource broadcast by the target UE for receipt by the UE and at least one base station; means for generate a first positioning measurement based on the common SRS resource; and means for report the first positioning measurement to a positioning entity.

In one implementations, a non-transitory storage medium including program code stored thereon, the program code is operable to configure at least one processor in a user equipment (UE) for supporting positioning of a target UE, the program code comprising instructions to: receive a common sounding reference signal (SRS) resource broadcast by the target UE for receipt by the UE and at least one base station; generate a first positioning measurement based on the common SRS resource; and report the first positioning measurement to a positioning entity.

Figure 1A:
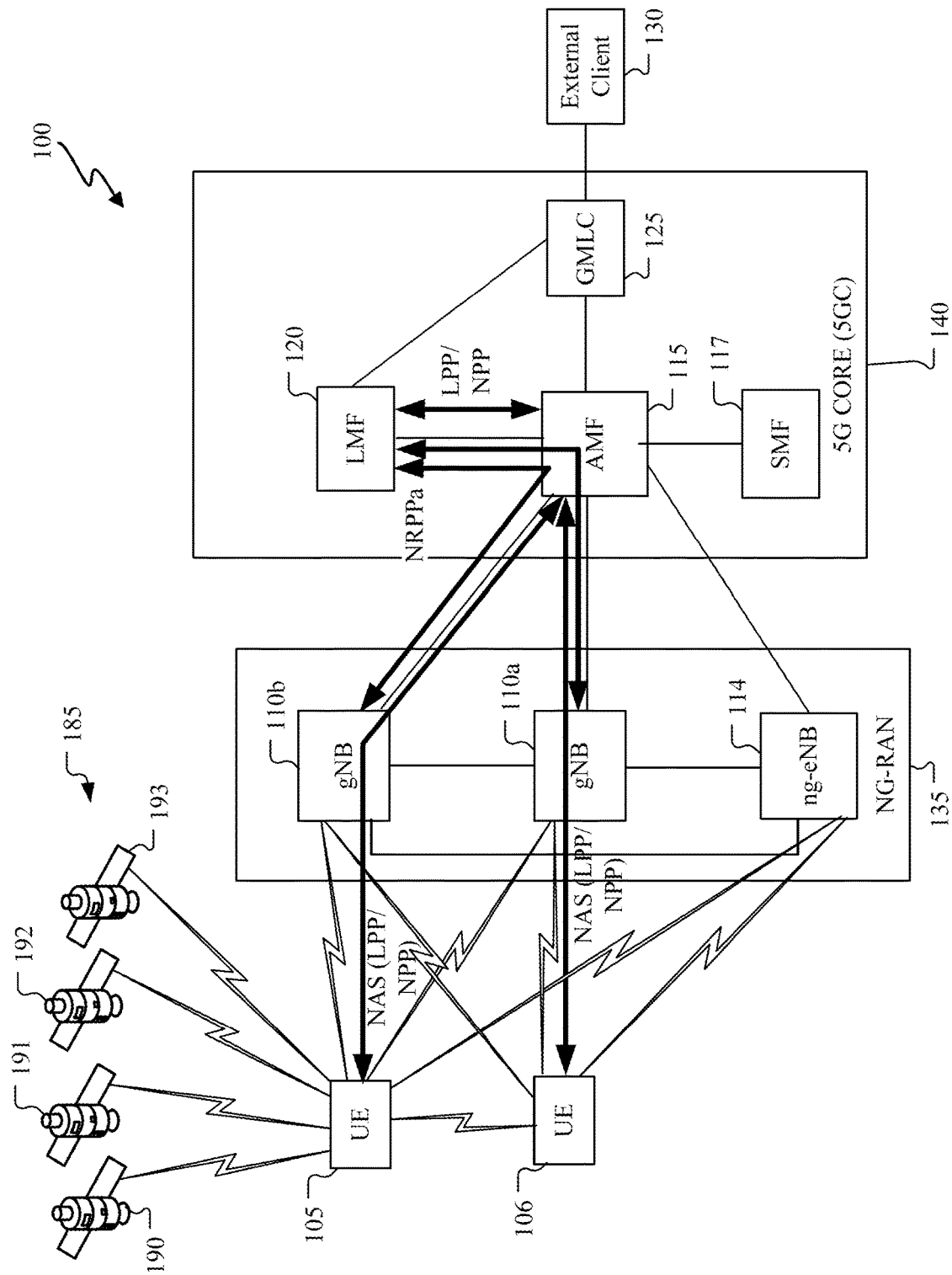
FIG. 1A shows an architecture of communication system including a number of UEs, a Radio Access Network (RAN), and a 5G Core Network (5GC).

Elements are indicated by numeric labels in the figures with like numbered elements in different figures representing the same element or similar elements. Different instances of a common element are indicated by following a numeric label for the common element with a distinct numeric suffix. In this case, a reference to the numeric label without a suffix indicates any instance of the common element.

DETAILED DESCRIPTION

Techniques are discussed herein for a positioning session for one or more user equipments (UEs) using a common set of sounding reference signals (SRS) for positioning that is received by both base stations and assisting or other UEs. The common set of SRS is broadcast by a UE and is received and measured by one or more base stations and one or more other UEs. The other UEs may have known positions and may serve as a positioning (anchor) node or may have unknown positions and may be jointly positioned with the target UE. During joint positioning, each of the other UEs may similarly broadcast a common set of SRS that is received and measured by the base stations and other UEs for positioning. The SRS may be broadcast by the target UE via a Uu interface or sidelink (SL) interface. The measurements performed by the base stations and other UEs, based on the common set of SRS broadcast by the UE may be provided to a positioning entity, e.g., a location server, for position determination of the UE or joint position determination of a plurality of UEs. In some implementations, one or more base stations may perform an angular measurement, e.g., Angle of Arrival (AOA), to resolve any mirror symmetry that may be present.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). A communication link through which UEs can send signals to other UEs is called a sidelink channel. As used herein the term traffic channel (TCH) can refer to either an uplink/reverse or downlink/forward or sidelink traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

FIG. 1A shows an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1A, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured wirelessly communicate to bi-directionally with the UE 105 and UE 106, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC 125 is communicatively coupled to an external client 130. The SMF 117 may serve as an initial contact point of a Service Control Function (SCF) (not shown) to create, control, and delete media sessions. The base stations 110*a*, 110*b*, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the base stations 110*a*, 110*b*, 114 may be configured to communicate with the UEs 105 and 106 via multiple carriers. Each of the base stations 110*a*, 110*b*, 114 may provide communication coverage for a respective geographic region, e.g., a cell. Each cell may be partitioned into multiple sectors as a function of the base station antennas.

FIG. 1A provides a generalized illustration of various components, any or all of which may be utilized as appropriate, and each of which may be duplicated or omitted, as necessary. Specifically, although only UEs 105 and 106 are illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1A illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UEs 105, 106) or at base stations 110*a*, 110*b*, 114 and/or provide location assistance to the UEs 105, 106 (via the GMLC 125 or other location server) and/or compute a location for the UEs 105, 106 at a location-capable device such as the UEs 105, 106, the base stations 110*a*, 110*b*, or the LMF 120 based on measurement quantities received at the UEs 105, 106 or the base stations 110*a*, 110*b*, 114 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality, respectively.

The system 100 is capable of wireless communication in that components of the system 100 can communicate with one another (at least sometimes using wireless connections) directly or indirectly, e.g., via the base stations 110*a*, 110*b*, 114 and/or the network 140 (and/or one or more other devices not shown, such as one or more other base transceiver stations). For indirect communications, the communications may be altered during transmission from one entity to another, e.g., to alter header information of data packets, to change format, etc. The UEs 105, 106 may include multiple UEs and may be a mobile wireless communication device but may communicate wirelessly and via wired connections. The UEs 105, 106 may be any of a variety of devices, e.g., a smartphone, a tablet computer, a vehicle-based device, etc., but these are examples only as the UEs 105, 106 is not required to be any of these configurations, and other configurations of UEs may be used. Other UEs may include wearable devices (e.g., smart watches, smart jewelry, smart glasses, or headsets, etc.). Still other UEs may be used, whether currently existing or developed in the future. Further, other wireless devices (whether mobile or not) may be implemented within the system 100 and may communicate with each other and/or with the UEs 105, 106, the base stations 110*a*, 110*b*, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UEs 105, 106 (e.g., via the GMLC 125).

The UEs 105, 106 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels, such as a physical sidelink synchronization channel (PSSCH), a physical sidelink broadcast channel (PSBCH), a physical sidelink control channel (PSCCH), sidelink channel state information reference signal (SL-CSIRS), physical sidelink feedback channel (PSFCH), or sidelink sounding reference signals (SL-SRS).

The UEs 105, 106 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UEs 105, 106 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UEs 105, 106 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UEs 105, 106 may support wireless communication using a Wireless Local Area Network (WLAN) which may connect to other networks (e.g., the Internet) using a Digital Subscriber Line (DSL) or packet cable, for example. The use of one or more of these RATs may allow the UEs 105, 106 to communicate with the external client 130 (e.g., via elements of the 5GC 140 not shown in FIG. 1A, or possibly via the GMLC 125) and/or allow the external client 130 to receive location information regarding the UEs 105, 106 (e.g., via the GMLC 125).

Each of the UEs 105, 106 may include a single entity or may include multiple entities such as in a personal area network where a user may employ audio, video and/or data I/O (input/output) devices and/or body sensors and a separate wireline or wireless modem. An estimate of a location of a UE, e.g., UE 105 or UE 106, may be referred to as a location, location estimate, location fix, fix, position, position estimate, or position fix, and may be geographic, thus providing location coordinates for the UE (e.g., latitude and longitude) which may or may not include an altitude component (e.g., height above sea level, height above or depth below ground level, floor level, or basement level). Alternatively, a location of the UE may be expressed as a civic location (e.g., as a postal address or the designation of some point or small area in a building such as a particular room or floor). A location of the UE may be expressed as an area or volume (defined either geographically or in civic form) within which the UE is expected to be located with some probability or confidence level (e.g., 67%, 95%, etc.). A location of the UE may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UEs 105, 106 may be configured to communicate with other entities using one or more of a variety of technologies. The UEs 105, 106 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1A include NR Node Bs, referred to as the gNBs 110a and 110b. Pairs of the gNBs 110a, 110b in the NG-RAN 135 may be connected to one another via one or more other gNBs. Access to the 5G network is provided to the UEs 105, 106 via wireless communication between the UEs and one or more of the gNBs 110a, 110b, which may provide wireless communications access to the 5GC 140 on behalf of the UE using 5G. In FIG. 1A, the serving gNB for the UE is assumed to be the gNB 110b, while the serving gNB for the UE 106 is assumed to be the gNB 110a, although another gNB may act as a serving gNB if the UEs 105, 106 move to another location or may act as a secondary gNB to provide additional throughput and bandwidth to the UEs 105, 106 and the UEs 105, 106 may share the same serving gNB.

Base stations (BSs) in the NG-RAN 135 shown in FIG. 1A may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNB s. The ng-eNB 114 may provide LTE wireless access and/or evolved LTE (eLTE) wireless access to the UEs 105, 106. One or more of the gNBs 110a, 110b and/or the ng-eNB 114 may be configured to function as positioning-only beacons which may transmit signals to assist with determining the position of the UEs 105, 106 but may not receive signals from the UEs 105, 106 or from other UEs.

The base stations 110a, 110b, 114 may each comprise one or more TRPs. For example, each sector within a cell of a base station may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Communications system 100 may support NR and support communications between the one or more base stations 110a, 110b, 114 and supported UEs 105 and 106. The UEs may be dispersed throughout the wireless communications system 100, and each UE may be stationary or mobile. As part of the communication, each of the base stations 110*a*, 110*b*, 114 and UEs 105 and 106 may support reference signal transmission for operations, including channel estimation, beam management and scheduling, and wireless device positioning within the coverage areas of one or more base stations.

For example, the base stations 110*a*, 110*b*, 114 may transmit one or more downlink reference signals for NR communications, including channel state information reference signal (CSI-RS) transmission. Each of the CSI-RS transmissions may be configured for a specific UE 105, 106 to estimate the channel and report channel quality information. The reported channel quality information may be used for scheduling or link adaptation at the base stations 110*a*, 110*b*, 114 or as part of a mobility or beam management procedure for directional transmission associated with the enhanced channel resources. Similarly, the UEs 105 and 106 may be configured to transmit uplink signals to one or more base stations 110*a*, 110*b*, 114 and sidelink transmissions between UEs 105 and 106.

The base stations 110*a*, 110*b*, 114 may transmit one or more additional downlink reference signals, including a positioning reference signal (PRS) transmission. The PRS transmission may be configured for a specific UE 105, 106, UE 106 to measure and report one or more report parameters (for example, report quantities) associated with positioning and location information. The PRS transmission and report parameter feedback may support various location services (for example, navigation systems and emergency communications). In some examples, the report parameters supplement one or more additional location systems supported by the UE 105, 106 (such as global positioning system (GPS) technology).

A base station 110*a*, 110*b*, 114 may configure a PRS transmission on one or more PRS resources of a channel. A PRS resource may span resource elements of multiple physical resource blocks (PRBs) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

The one or more PRS resources may span a number of PRS resource sets according to a PRS resource setting of the base station 110*a*, 110*b*, 114. The structure of the one or more PRS resources, PRS resource sets, and PRS resource settings within a PRS transmission may be referred to as a multi-level resource setting. For example, multi-level PRS resource setting of the base station 110*a*, 110*b*, 114 may include multiple PRS resource sets and each PRS resource set may contain a set of PRS resources (such as a set of 4 PRS resources).

The UEs 105, 106 may receive the PRS transmission over the one or more PRS resources of the slot. The UEs 105, 106 may determine a report parameter for at least some of if not each PRS resource included in the transmission. The report parameter (which may include a report quantity) for each PRS resource may include one or more of a time of arrival (TOA), a reference signal time difference (RSTD), a reference signal receive power (RSRP), an angle, a PRS identification number, a reception to transmission difference (UE Rx-Tx), a signal-to-noise ratio (SNR), or a reference signal receive quality (RSRQ).

Similarly, the UEs 105, 106 may be configured to transmit one or more additional uplink reference signals that may be received by base stations 110*a*, 110*b*, 114 and used for positioning. For example, UEs 105 may transmit sounding reference signal (SRS) for positioning. Base stations 110*a*, 110*b*, 114 that receive uplink reference signals from a UEs 105, 106 may perform positioning measurements, such as one or more of a time of arrival (TOA), reception to transmission difference (UE Rx-Tx).

Aspects of wireless communications system 100 may include use of downlink PRS transmissions by the base station 110*a*, 110*b*, 114 or uplink SRS transmissions by a UE, e.g., UE 105 or UE 106, for UE location determination. For downlink-based UE location determination, a location server, e.g., LMF 120 in a NR network, or E-SMLC in LTE (sometimes referred to as location server 120), may be used to provide positioning assistance, such as PRS assistance data (AD) to the UE. For uplink-based UE location determination, a location server 120 and/or a serving base station, e.g., gNB 110*a*, may be used to provide positioning assistance, such as SRS assistance data, to receiving entities, such as base stations (e.g., gNBs 110*a*, 110*b*, and the other UE(s)). The SRS assistance data, for example, may include the SRS transmission occasion and other parameters, e.g., such as the reference signal pattern, power if different from nominal, the number of repetitions, etc.

A position estimation of the UE may be determined using reference signals, such as PRS signals or SRS for positioning signals, or other reference signals, from one or more base stations 110*a*, 110*b*, 114 or the UE. Positioning methods, such as Time Difference of Arrival (TDOA), DL Time Difference of Arrival (DL-TDOA), DL Angle of Departure (DL AoD), Enhanced Cell ID (ECID) are position methods that may be used to estimate the position of the UE using reference signals from base stations. TDOA, for example, relies on measuring Reference Signal Time Differences (RSTDs) between downlink (DL) signals received from a base station for a reference cell and base station(s) for one or more neighbor cells. The DL signals for which RTSDs may be obtained comprise a Cell-specific Reference Signal (CRS) and a Positioning Reference Signal (PRS)— e.g., as defined in 3GPP TS 36.211.

Other positioning methods may use reference signals transmitted by the UE including uplink based positioning methods and downlink and uplink based positioning methods. For example, uplink based positioning methods include, e.g., UL Time Difference of Arrival (UL-TDOA), UL Angle of Arrival (UL AoA), UL Relative Time of Arrival (UL-RTOA) and downlink and uplink based positioning methods, e.g., Round-trip time (RTT) with one or more neighboring base stations. Additionally, sidelink based positioning may be used in which UEs transmit and/or receive sidelink positioning reference signals that are measured and used for positioning.

As noted, while FIG. 1A depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UEs 105, 106, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1A.

The gNBs 110a, 110b and the ng-eNB 114 may communicate with the AMF 115, which, for positioning functionality, communicates with the LMF 120. The AMF 115 may support mobility of the UEs 105, 106, including cell change and handover and may participate in supporting a signaling connection to the UEs 105, 106 and possibly data and voice bearers for the UEs 105, 106. The LMF 120 may communicate directly with the UEs 105, 106, e.g., through wireless communications, or directly with the base stations 110a, 110b, 114. The LMF 120 may support positioning of the UEs 105, 106 when the UEs 105, 106 accesses the NG-RAN 135 and may support position procedures/methods such as Assisted GNSS (A-GNSS), Time Difference of Arrival (TDOA) (e.g., Downlink (DL) TDOA or Uplink (UL) TDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UEs 105, 106, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE) may be performed at the UE (e.g., using signal measurements obtained by the UE for signals transmitted by wireless nodes such as the gNBs 110a, 110b and/or the ng-eNB 114, and/or assistance data provided to the UE, e.g., by the LMF 120). At least part of the positioning functionality (including derivation of the location of the UE) alternatively may be performed at the LMF 120 (e.g., using signal measurements obtained by the gNBs 110a, 110b and/or the ng-eNB 114. The AMF 115 may serve as a control node that processes signaling between the UEs 105, 106 and the core network 140, and provides QoS (Quality of Service) flow and session management. The AMF 115 may support mobility of the UEs 105, 106 including cell change and handover and may participate in supporting signaling connection to the UEs 105, 106.

The GMLC 125 may support a location request for the UEs 105, 106 received from the external client 130 and may forward such a location request to the AMF 115 for forwarding by the AMF 115 to the LMF 120 or may forward the location request directly to the LMF 120. A location response from the LMF 120 (e.g., containing a location estimate for the UEs 105, 106) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1A, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1A, the LMF 120 and the UEs 105, 106 may communicate using an LTE Positioning Protocol (LPP), which may be defined in 3GPP TS 36.355. The LMF 120 and the UEs 105, 106 may also or instead communicate using a New Radio Positioning Protocol (which may be referred to as NPP or NRPP), which may be the same as, similar to, or an extension of LPP. Here, LPP and/or NPP messages may be transferred between the UEs 105, 106 and the LMF 120 via the AMF 115 and the serving gNB 110a, 110b or the serving ng-eNB 114 for the UEs 105, 106. For example, LPP and/or NPP messages may be transferred between the LMF 120 and the AMF 115 using a 5G Location Services Application Protocol (LCS AP) and may be transferred between the AMF 115 and the UEs 105, 106 using a 5G Non-Access Stratum (NAS) protocol. Communication between the LMF 120 and UEs 105, 106 using LPP protocol, may sometimes referred to herein as direct communication, as the messages are transparent to the serving gNB, i.e., the serving gNB does not need to understand the content of the message, but simply forwards the communication between the LMF 120 and UEs 105,106. In contrast, during communications using NPP protocol, such as NRPPa, the serving gNB unpacks the message, picks out the content, which is packed and sent to UE, e.g., in a Uu air interface via Radio Resource Control (RRC), Medium Access Control—Control Element (MAC-CE), Downlink Control Information (DCI), etc. The LPP and/or NPP protocol may be used to support positioning of the UEs 105, 106 using UE-assisted and/or UE-based position methods such as A-GNSS, RTK, TDOA, AOA, AOD, and/or E-CID. The NRPPa protocol may be used to support positioning of the UEs 105, 106 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional Synchronization Signal (SS) transmissions from the gNBs 110a, 110b, and/or the ng-eNB 114. The LMF 120 is illustrated in FIG. 1A as being located in the core network 140, but may be external to the core network 140, e.g., in an NG-RAN. For example, the LMF 120 may be co-located or integrated with a gNB or a TRP, or may be disposed remote from the gNB and/or the TRP and configured to communicate directly or indirectly with the gNB and/or the TRP.

With a UE-assisted position method, the UE, e.g., UE 105 or UE 106 may obtain location measurements and send the measurements to a location server (e.g., the LMF 120) for computation of a location estimate for the UE. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ), AOA, AOD, for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE, e.g., UE 105 or UE 106, may obtain location measurements (e.g., which may be the same as or similar to location measurements for a UE-assisted position method) and may compute a location of the UE (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114), sidelink UEs, or APs may obtain location measurements (e.g., measurements of RSSI, RTT, RSRP, RSRQ, AOA, AOD, or Time of Arrival (ToA) for signals transmitted by the UE, e.g., UE 105 or UE 106) and/or may receive measurements obtained by the UE. The one or more base stations or APs may send the measurements to a location server (e.g., the LMF 120) for computation of a location estimate for the UE.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UEs 105, 106 as assistance data in an LPP and/or NPP message via the NG-RAN 135 and the 5GC 140.

An LPP or NPP message sent from the LMF 120 to the UEs 105, 106 may instruct the UEs 105, 106 to do any of a variety of things depending on desired functionality. For example, the LPP or NPP message could contain an instruction for the UEs 105, 106 to obtain measurements for GNSS (or A-GNSS), WLAN, E-CID, and/or TDOA (or some other position method). In the case of E-CID, the LPP or NPP message may instruct the UEs 105, 106 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UEs 105, 106 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UEs 105, 106 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1A) in the 5GC 150. For example, the WLAN may support IEEE 802.11 WiFi access for the UEs 105, 106 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UEs 105, 106. In these other embodiments, positioning of the UEs 105, 106 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

Positioning for UEs in a radio network, such as communication system 100 shown in FIG. 1A, typically uses Uu interfaces, i.e., radio interface between the UE and the radio access network, for DL PRS and/or UL PRS. Positioning for UEs may use sidelink PRS (SL-PRS), which may be a specific sidelink defined reference signal for positioning or may reuse Uu PRS, e.g., UL PRS, sometimes referred to as Sounding Reference Signal for positioning (SRSPos), or other reference signals may be transmitted in the sidelink channel. Sidelink positioning may enhance UE positioning by providing an additional transmission (or reception) node.

Figure 1B:
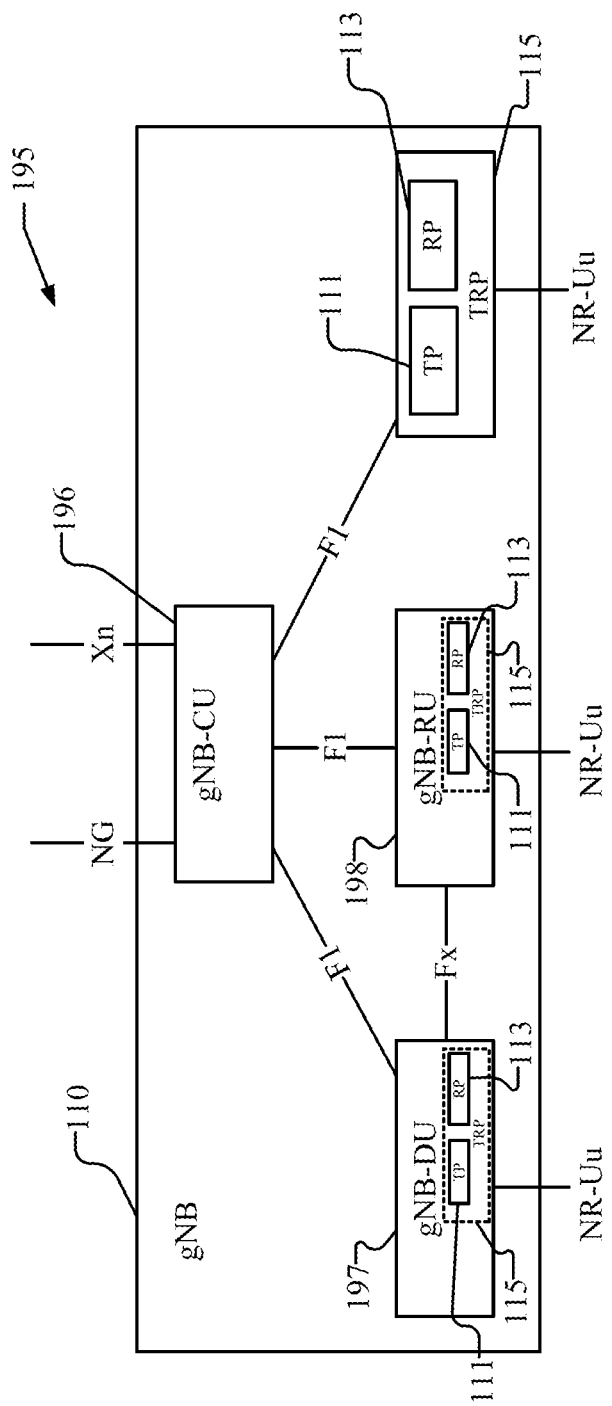
FIG. 1B shows an architecture diagram of an RAN node that may be within the RAN in FIG. 1A

FIG. 1B shows an architecture diagram of an NG-RAN node 195 that may be within an NG-RAN 135 in FIG. 1A, e.g., as a separate entity or as part of another gNB. The NG-RAN node 195 may be a TRP 110, according to one implementation. The architecture shown in FIG. 1A, for example, may be applicable to any TRP 110 in FIG. 1A.

As illustrated, TRP 110 may include a gNB Central Unit (gNB-CU) 196, a gNB Distributed Unit (gNB-DU) 197, a gNB Remote Unit (gNB-RU) 198, which may be physically co-located in the TRP 110 or may be physically separate. The gNB-CU 196 is a logical or physical node hosting support for Radio Resource Control (RRC), Service Data Adaptation Protocol (SDAP) and Packet Data Convergence Protocol (PDCP) protocols of the TRP 110 used over the NR Uu air interface and controlling the operation of one or more gNB-DUs and/or gNB-RUs. The gNB-CU 196 terminates an F1 interface connected with a gNB-DU and in some implementations, an F1 interface connected with a gNB-RU. As illustrated, the gNB-CU 196 may communicate with an AMF via an NG interface. The gNB-CU 196 may further communicate with one or more other gNBs 110 via an Xn interface. The gNB-DU 197 is a logical or physical node hosting support for Radio Link Control (RLC), Medium Access Control (MAC) and Physical (PHY) protocol layers used over the NR Uu air interface of the TRP 110, operation of which is partly controlled by gNB-CU 196. The gNB-DU terminates the F1 interface connected with the gNB-CU 196, and may terminate a lower layer split point interface Fx with a gNB-RU. The gNB-RU 198 may be based on a lower layer function split and is a logical or physical node hosting support for lower layer functions, such as PHY and Radio Frequency (RF) protocol layers used over the NR Uu air interface of the TRP 110, operation of which is partly controlled by gNB-CU 196 and/or gNB-DU 197. The gNB-RU 198 terminates the Fx interface connected with the gNB-DU 197 and in some implementations may terminate the F1 interface connected with the gNB-CU 196.

The gNB-CU 196 requests positioning measurements (e.g. E-CID) to the gNB-DU 197 and/or gNB-RU 198. The gNB-DU 197 and/or gNB-RU 198 may report the measurements back to the gNB-CU 196. A gNB-DU 197 or gNB-RU 198 may include positioning measurement functionality. It should be understood that a separate measurement node is not precluded.

Additionally, as illustrated in FIG. 1B, TRP 110 may include a Transmission Point (TP) 111 and a Reception Point (RP) 113 combined into a Transmission Reception Point (TRP) 115, which may be physically or logically located in the TRP 110. The gNB-CU 196 may be configured to communicate with the TP 111 and RP 113, e.g., via F1 interfaces. The gNB-CU 196, thus, controls one or more TPs 111 and RPs 113 which are accessible from the gNB-CU 196 via an F1 interface.

In some embodiments, the NG-RAN node 195 (or gNB 110) may comprise a subset of the elements shown in FIG. 1B. For example, the NG-RAN node 195 may comprise the gNB-CU 196 but may not include one or more of gNB-DU 197 and gNB-RU 198, RP 113, or TP 111. Alternatively, NG-RAN node 195 may include one or more of gNB-DU 197 and, RP 113 or TP 111 but may not include gNB-RU 198. Further, the elements shown in FIG. 1B may be logically separate but physically co-located or may be partially or completely physically separate. For example, one or more of gNB-DU 197 and/or gNB-RU 198, RP 113 or TP 111 may be physically separate from gNB-CU 196 or may be physically combined with gNB-CU 196. In the case of physical separation, the F1 or Fx interface may define signaling over a physical link or connection between two separated elements. In some implementations, gNB-CU 196 may be split into a control plane portion (referred to as a CU-CP or gNB-CU-CP) and a user plane portion (referred to as CU-UP or gNB-CU-UP). In this case, both the gNB-CU-CP and gNB-CU-UP may interact with gNB-DU 197 and/or gNB-RU 198 to support NR Uu air interface signaling for control plane and user plane, respectively. However, only the gNB-CU-CP may interact with TPs 111 and RPs 113 to support and control location related communication.

Protocol layering between the gNB-CU 196 and the TP 111, and RP 113 may be based on F1 C as defined in 3GPP TS 38.470, which uses an F1 Application Protocol (F1AP) at the top level as specified in 3GPP TS 38.473. New messages to support positioning could be added directly into F1AP or could be introduced in a new location specific protocol which is transported using F1AP.

The location procedures with the gNB-CU 196 may comprise all location related procedures on NG, Xn, and NR-Uu interfaces. For example, the location procedures between AMF 115 and the NG-RAN node 195 may use NGAP. The location procedures between NG-RAN node 195 and other NG-RAN nodes, e.g., gNBs 110, may use XnAP or a protocol above XnAP, such as an extended NR Positioning Protocol A (NRPPa) as defined in 3GPP TS 38.455. The location procedures between NG-RAN node 195 and UE 105 may use RRC and/or LPP.

The corresponding messages to support positioning may be carried inside a transparent F1AP message transfer container. For example, the Transfer of an NGAP Location Reporting Control and NAS Transport message may be carried in an UL/DL NGAP Message Transfer. The Transfer of location related XnAP messages may be carried in an UL/DL XnAP Message Transfer. The Transfer of location related RRC(LPP) messages may be carried in an UL/DL RRC (LPP) Message Transfer.

Figure 2:
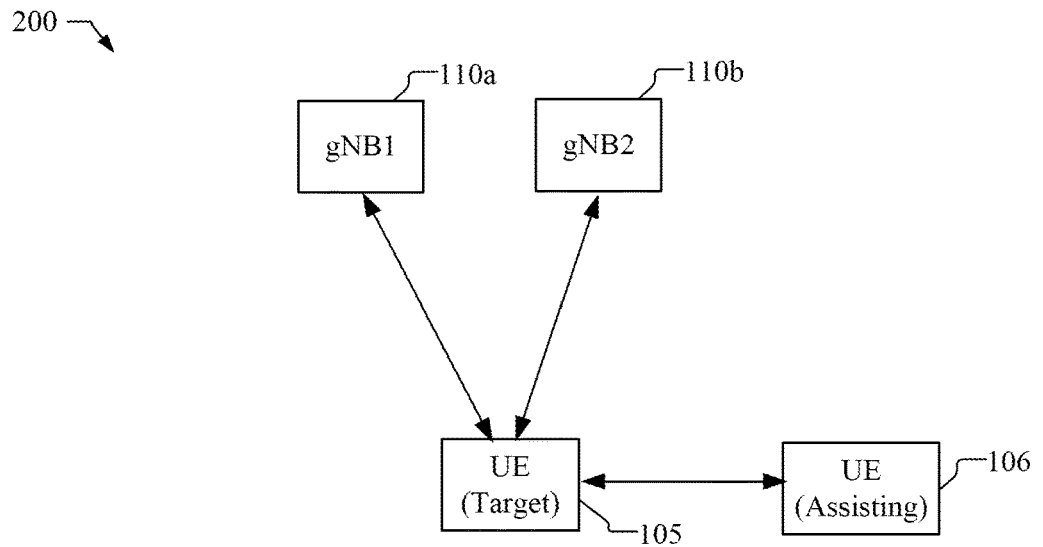
FIG. 2 illustrates a wireless communications system in which positioning of a UE may be performed using downlink and/or uplink signaling between base stations, a target UE 105, and a sidelink UE.

FIG. 2 illustrates a wireless communications system 200 in which positioning may be performed using downlink and/or uplink Uu signaling between base stations 110, e.g., gNB1 110a, gNB2 110b, and a target UE 105, and sidelink (SL) signaling between the target UE 105 and another UE 106 (sometimes referred to herein as an assisting UE 106). The assisting UE 106 may have a known position, e.g., which may be previously determined. The use of assisting UE 106 may be advantageous, e.g., if the number of visible base stations 110 or base stations 110 with a line of sight to the target UE 105 is insufficient for direct positioning of the target UE 105.

Various existing approaches for position determination of the target UE 105 rely on a combination of downlink or uplink signaling, such as RTT or TDOA. For example, DL PRS and UL SRS (via the Uu interface) may be used to generate RTT measurements for each of gNB1 110a and gBN2 110b, or DL PRS or UL SRS (via the Uu interface) may be used generate a TDOA measurement. Additional signaling for SL PRS (via the SL interface) with assisting UE 106 may be used to further generate an RTT measurement or additional TDOA measurements. The use of both PRS and SRS, as well as SL PRS transmissions, however, requires additional resources, as well as an increased power consumption to transmit and receive different types of reference signals.

Accordingly, in one implementation, joint signaling through common SRS transmissions (e.g., joint SL/Uu signaling) may be used for positioning. For example, the target UE 105 may broadcast common SRS transmissions that are received and measured by both gNBs and other UEs for positioning of the target UE 105.

Figure 3:
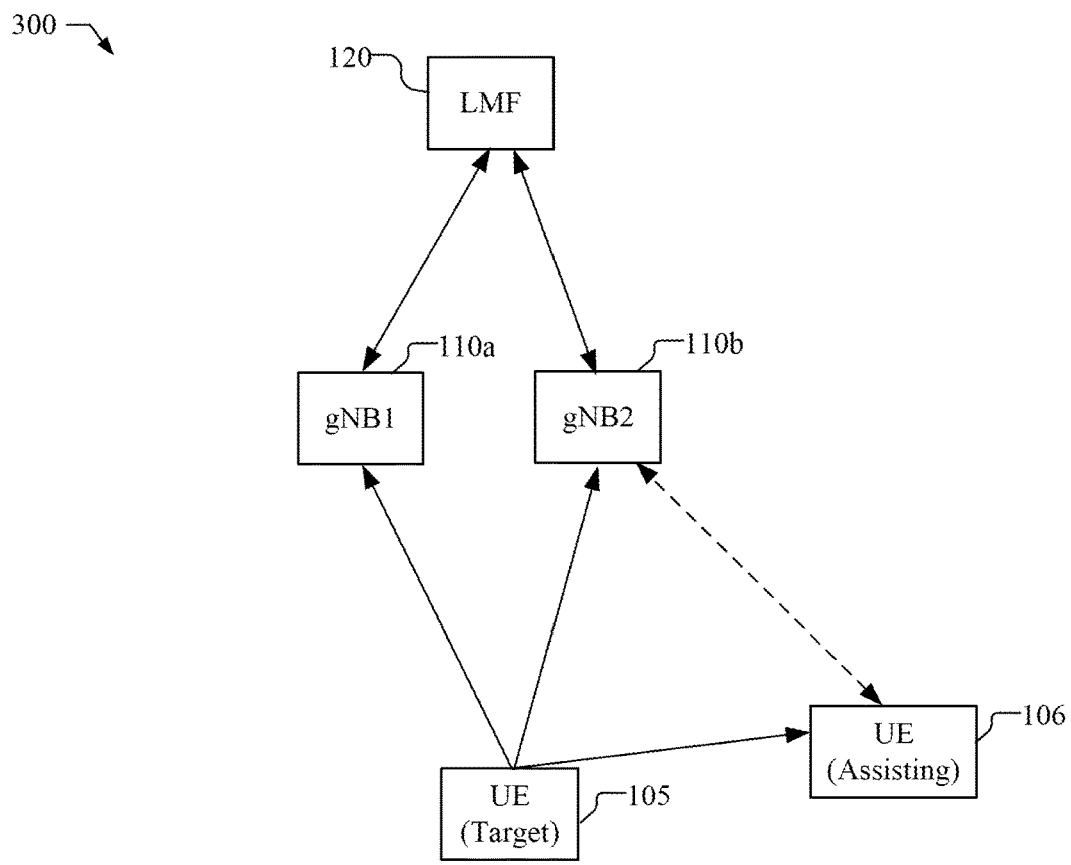
FIG. 3 illustrates a wireless communications system in which positioning of a target UE may be performed using common SRS resources broadcast by a target UE to one or more base stations and one or more other UEs.

FIG. 3, for example, illustrates a wireless communications system 300 in which positioning may be performed using common SRS resources broadcast by the target UE 105 and that is received by one or more base stations 110, e.g., gNB1 110a, gNB2 110b, and one or more other UEs, e.g., assisting UE 106. The common SRS resources that are broadcast by the target UE 105 may be transmitted via Uu interface or via the SL interface. For example, the target UE 105 may be configured to broadcast a common SRS to be received by one or more gNBs 110 and one or more assisting UEs 106. For example, the target UE 105 may be configured to broadcast common SRS in specific slot(s)/symbol(s) and/or specific resource. The assisting UEs 106 are similarly configured to receive the broadcast the common SRS, e.g., the assisting UEs 106 are configured with the specific slot(s)/symbol(s) and/or specific resource to expect to receive the common SRS to perform the measurement. The UE 106 may be configured to receive SRS resources from target UE 105 over Uu the interface, or gNBs 110 may be configured for decoding SL signaling. The assisting UE 106 may have a known position, e.g., which may be previously determined. The use of assisting UE 106 may be advantageous, e.g., if the number of visible base stations 110 or base stations 110 with a line of sight to the target UE 105 is insufficient for direct positioning of the target UE 105.

The location server 120 or the serving base station 110, e.g., gNB1 110a may provide SRS configuration information, e.g., assistance data, to other base stations, e.g., gNB2 110b, and/or to other UEs, e.g., assisting UE 106. The SRS configuration information, for example, may include information such as the SRS transmission occasions and other parameters, including the reference signal pattern, reference signal power (e.g., if different from nominal), the number of repetitions, etc.

The base stations 110 may provide the positioning measurements produced based on the common SRS resources broadcast by the target UE 105 to the location server 120. Additionally, the assisting UE 106 may provide the positioning measurements produced using the common SRS resources broadcast by the target UE 105 to the location server 120, e.g., via a base station (gNB 2 110b) using a Uu interface or through the target UE 105 using a SL interface.

The positioning measurements generated by the base stations 110 and the assisting UE 106 may be RSTD related measurements for TDOA.

Figure 4:
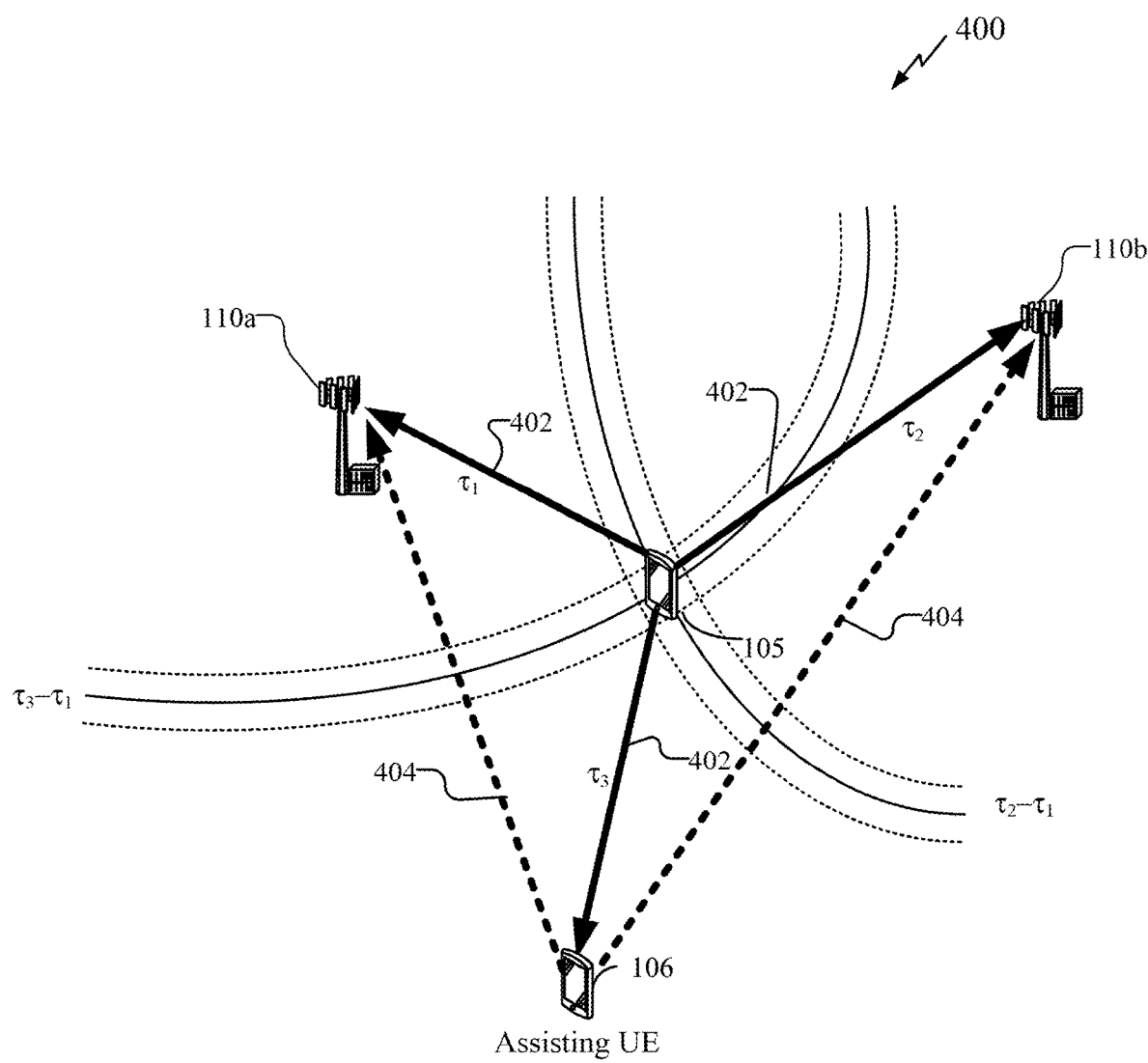
FIG. 4 illustrates an exemplary wireless communications system implementing positioning using a Time Difference of Arrival (TDOA) technique with a common SRS resources broadcast by the target UE to base stations and other UEs.

FIG. 4 illustrates an exemplary wireless communications system 400 implementing positioning using a Time Difference of Arrival (TDOA) technique with a common SRS resources broadcast by the target UE1 105 that is received by a gNB1 110*a* and a neighboring gNB2 110*b* and an assisting UE2 106.

As illustrated, the UE1 105 broadcasts a common SRS 402 that is received by the gNB1 110*a*, gNB2 110*b* and the assisting UE 106. As illustrated, the assisting UE2 106 may transmit, e.g., broadcast or directly transmit, SRS 404 that is received by the by the gNB1 110*a*, gNB2 110*b* and in some implementations, the target UE1 105. Assuming the SRS 402 and 404 are aligned in time, the time for SRS 404 to be received by gNB 110*a* will include the time of flight of SRS 402 between the UE1 105 and the assisting UE2 106 (referred to herein as the time of flight ($T_{UE1-UE2}$)), the time between the reception of the SRS 402 and transmission of the SRS 404 by the assisting UE 106 (referred to herein the UE2 receive-transmit (Rx-Tx) time difference ($T_{UE2,Rx-Tx}$), and the time of flight of SRS 404 from assisting UE 106 to the gNB1 110*a* (referred to herein as the time of flight ($T_{UE2-gNB1}$)).

The RSTD for SRS 402 and 404 at the gNB1 110*a* may then be determined based on the difference between the time of reception of the SRS 402 and SRS 404 minus the time of flight ($T_{UE2-gNB1}$) and the UE2 Rx-Tx time difference ($T_{UE2,Rx-Tx}$). The RSTD for SRS 402 and 404 at the gNB2 110*b* may be similarly determined. The resulting RSTD measurements are determined with little or no influence from the network synchronization errors.

At least two RSTD measurements are needed, but more than two measurements may be desirable. Geometrically, each RSTD defines a hyperbola, where the width of the hyperbola is determined by any uncertainty. If the coordinates of the gNBs 110 and the assisting UE 106 are known, the position of the UE 105 may be determined. Uncertainty in the base station 110 coordinates or transmit time offsets will directly impact the accuracy of the UE location estimate.

Figure 5:
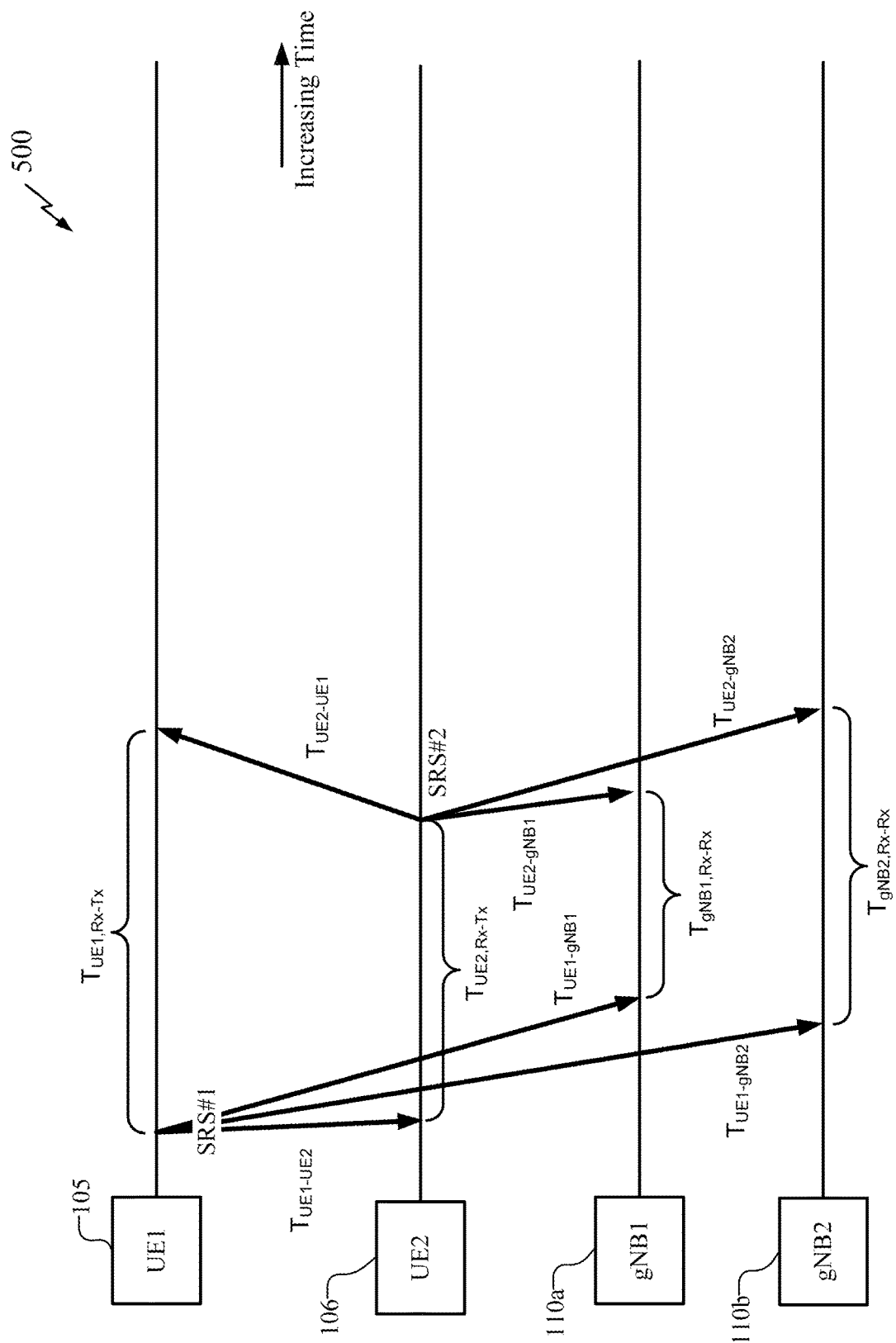
FIG. 5 illustrates a timing diagram for the broadcast of common SRS by a target UE to base stations and other UEs.

FIG. 5 illustrates a timing diagram 500 for the broadcast of common SRS by a target UE1 105 for TDOA positioning illustrated in FIG. 4. As illustrated, the target UE1 105 broadcasts SRS #1 (at time $T_{UE1\_Tx}$), which is received by assisting UE2 106, gNB1 110*a* and gNB2 110*b* (at times $T_{UE2\_Rx}$, $T_{gNB1\_Rx1}$, and $T_{gNB2\_Rx1}$, respectively). The time of flight of SRS #1 between UE1 and UE2 is $T_{UE1-UE2}$, the time of flight of SRS #1 between UE1 and gNB1 110*a* is $T_{UE1-gNB1}$, and the time of flight of SRS #1 between UE1 and gNB2 110*b* is $T_{UE1-gNB2}$.

After the assisting UE2 106 receives the SRS #1, the UE2 106 broadcasts a common SRS #2 (at time $T_{UE2\_Tx}$), that is received by gNB1 110*a* and gNB2 110*b* (at times $T_{gNB1\_Rx2}$, and $T_{gNB2\_Rx2}$, respectively). In some implementations, the SRS #2 may also be received by target UE1 105 (at time $T_{UE1\_Rx}$). The Rx-Tx time difference at the UE2 106 between receiving the SRS #1 and transmitting SRS #2 is illustrated as $T_{UE2,Rx-Tx}$. The time of flight of SRS #2 between UE2 and gNB1 110*a* is $T_{UE2-gNB1}$, and the time of flight of SRS #2 between UE2 and gNB2 110*b* is $T_{UE2-gNB2}$, and the time of flight of SRS #2 between UE2 and UE1 is $T_{UE2-UE1}$. It is noted that the time of flight between nodes with known positions may be determined based on a calculated distance between the nodes. The receive-receive (Rx-Rx) time difference for SRS #1 and SRS #2 measured at the gNB1 110*a* is $T_{gNB1,Rx-Rx}$, the Rx-Rx time difference for SRS #1 and SRS #2 measured at the gNB2 110*b* is $T_{gNB2,Rx-Rx}$, and a Rx-Tx time difference for SRS #1 and SRS #2 measured by the target UE1 105 is $T_{UE1,Rx-Tx}$.

For each UE with an unknown position, i.e., target UE1 105, the following sets of SRS measurements from receiving nodes with known positions (e.g., assisting UE2 106, gNB1 110*a*, and gNB2 110*b*) may be provided (assuming there is no timing drift at the assisting UE2 106).

$$T_{UE1\text{-}gNB1} - T_{UE1\text{-}gNB2} = (T_{gNB1\_Rx1} - T_{UE1\_Tx}) - (T_{gNB2\_Rx1} - T_{UE1\_Tx}) = T_{gNB1\_Rx1} - T_{gNB2\_Rx1} \quad \text{eq. 1}$$

$$T_{UE1\text{-}gNB1} - T_{UE1\text{-}UE2} = (T_{gNB1\_Rx1} - T_{UE1\_Tx}) - (T_{UE2\_Rx} - T_{UE1\_Tx}) = T_{gNB1\_Rx1} - T_{UE2\_Rx} \quad \text{eq. 2}$$

Thus, the position of the target UE1 105 may be determined based on the time of reception of the SRS #1 at the gNB1 110*a* and the gNB2 110*b*, and the assisting UE2 106, along with the known positions of the gNB1 110*a*, gNB2 110*b*, and assisting UE2 106.

If timing drift is present at the assisting UE2 106, equation 2 may be replaced by the receive-receive (Rx-Rx) measurement at one of the gNBs, e.g., gNB1 110*a*, and the Rx-Tx time difference at the assisting UE2 106 as follows.

$$T_{UE1\text{-}gNB1} - T_{UE1\text{-}UE2} = T_{UE2,Rx\text{-}Tx} + T_{UE2\text{-}gNB1} - T_{gNB1,Rx\text{-}Rx} \quad \text{eq. 3}$$

With use of equation 3, and the known positions of assisting UE2 106 and gNB1 110*a*, with which the time of flight $T_{UE2\text{-}gNB1}$ can be calculated, the position of the target UE1 105 in the presence of a timing drift at assisting UE2 106.

Alternatively, with the Rx-Tx measurements between transmission of SRS #1 and reception of SRS #2 at the target UE1 105, equation 2 may be replaced with an RTT determination as follows.

$$RTT = T_{UE1\text{-}Tx\text{-}Rx} - T_{UE2,Rx\text{-}Tx} = T_{UE1\text{-}UE2} + T_{UE2\text{-}UE1} \quad \text{eq. 4}$$

The RTT can be converted into a distance between the target UE1 105 and the assisting UE2 106 (e.g., distance=c*RTT/2). It should be understood that instead of using a second base station, e.g., gNB2 110*b*, an additional assisting UE with a known position may be used.

Thus, the position of the target UE 105 may be determined using the time of reception of the SRS by other UEs 106 and gNBs 110, as well as Rx-Tx time differences and Rx-Rx time differences, which may be reported by the target UE 105, assisting UE 106, and gNBs 110 to a positioning entity, such as a location server 120 or UE 105.

Cooperative positioning (sometimes referred to as joint positioning) of multiple UEs having unknown position may be performed using a SL signaling between UEs and DL and/or UL signaling with one or more base stations.

Figure 6:
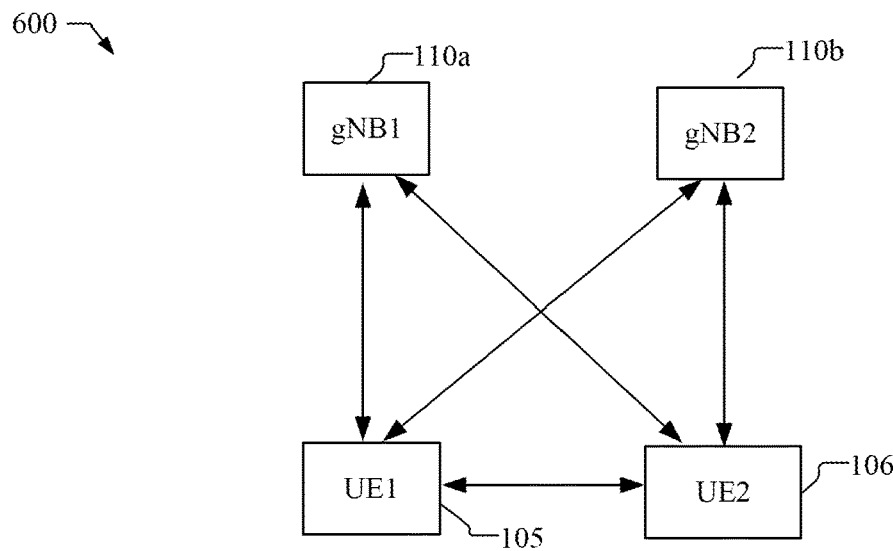
FIG. 6 illustrates a wireless communications system in which positioning of multiple UEs may be performed using downlink and/or uplink signaling between base stations and sidelink UEs.

FIG. 6 illustrates a wireless communications system 600 in which positioning of multiple UEs, illustrated as UE 105 and UE 106 may be performed using downlink and/or uplink Uu signaling between base stations 110, e.g., gNB1 110*a*, gNB2 110*b*, and the UEs 105, 106 and sidelink (SL) signaling between the UEs 105, 106. For example, if the number of visible base stations 110 or base stations 110 with a line of sight to any one of the UEs 105, 106 is insufficient for direct positioning, the use of SL signaling or measurements with the additional UE may be useful as it may provide additional equations to enable positioning of the UEs 105, 106.

As discussed in FIG. 2, various existing approaches for position determination of the UEs 105, 106 rely on a combination of downlink or uplink signaling, such as RTT or TDOA. For example, DL PRS and UL SRS (via the Uu interface) may be used to generate RTT measurements for each of gNB1 110*a* and gBN2 110*b*, or DL PRS or UL SRS (via the Uu interface) may be used generate a TDOA measurement. Additional signaling using SL PRS (via the SL interface) between the UE 105 and UE 106 may be used to further generate an RTT measurement or additional TDOA measurements. The use of both PRS and SRS, as well as SL PRS transmissions, however, requires additional resources, as well as an increased power consumption to transmit and receive different types of reference signals.

Accordingly, in one implementation, joint signaling through common SRS transmissions (e.g., joint SL/Uu signaling) from a number of UEs with unknown positions may be used for positioning the UEs. For example, the UE 105 and UE 106 may both broadcast common SRS transmissions that are received and measured by both gNBs and other UEs for positioning of the UEs 105 and 106.

Figure 7:
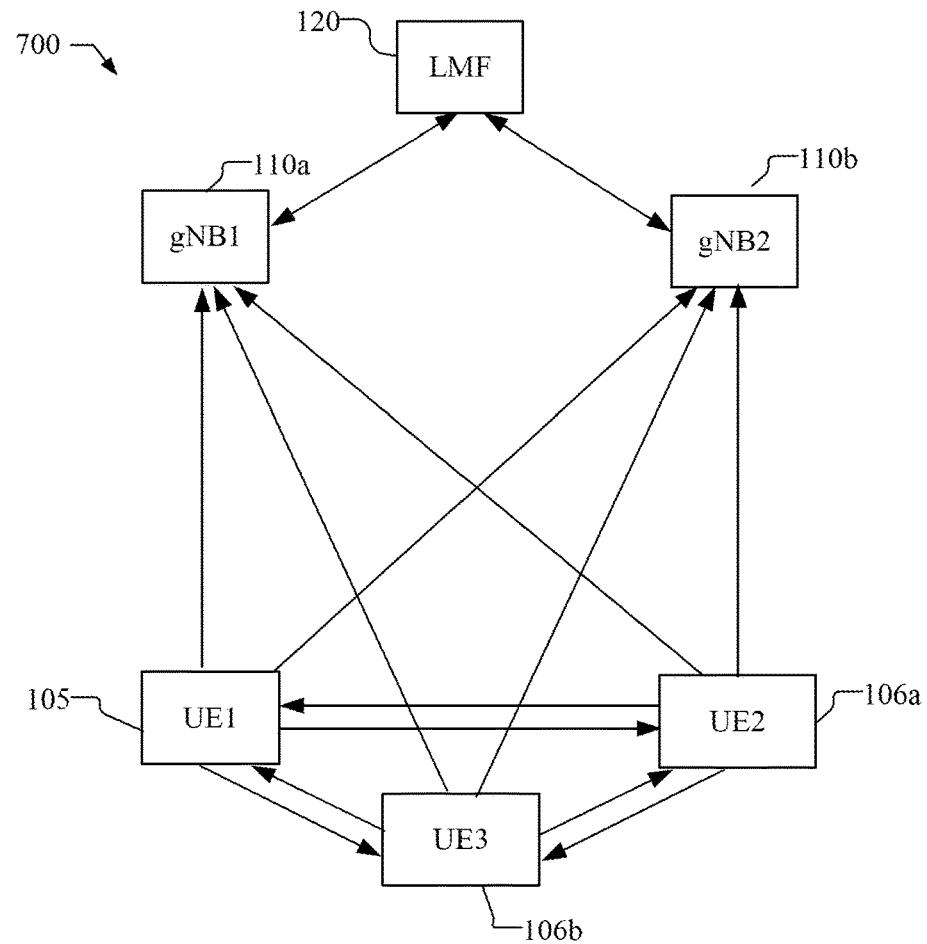
FIG. 7 illustrates a wireless communications system in which positioning of multiple UEs may be performed using common SRS resources broadcast by the UEs that is received by one or more base stations and other UEs.

FIG. 7, for example, illustrates a wireless communications system 700 in which positioning of multiple UEs (illustrated as UE1 105, UE2 106a, and UE3 106b) may be performed using common SRS resources broadcast by the UEs 105, 106a, and 106b and that is received by one or more base stations 110, e.g., gNB1 110a, gNB2 110b, and the other UEs, e.g., UEs 105, 106a, and 106b. The common SRS resources that are broadcast by each of the UEs, e.g., UE1 105, UE2 106a, and UE3 106b, may be transmitted via Uu interface or via the SL interface. For example, the UEs 105 and 106 may be each configured to broadcast a common SRS to be received by one or more gNBs 110 and other UEs. For example, the configuration for the common SRS may include specific slot(s)/symbol(s) and/or specific resources. The UEs are similarly configured to receive the broadcast the common SRS, e.g., each UE is configured with the specific slot(s)/symbol(s) and/or specific resource to expect to receive the common SRS broadcast by other UEs to perform the measurement. The UEs may be configured to receive SRS resources over Uu the interface, or gNBs 110 may be configured for decoding SL signaling. Each of the UEs, e.g., UE1 105, UE2 106a, and UE3 106b may have an unknown position. It should be understood that while FIG. 7 illustrates three UEs with unknown positions, additional or fewer UEs with unknown positions may be used. The use of the broadcast of common SRS resources and measurements from multiple UEs may be advantageous, e.g., if the number of visible base stations 110 or base stations 110 with a line of sight is insufficient for direct positioning of a single UE.

The location server 120 or the serving base station 110, e.g., gNB1 110a may provide SRS configuration information, e.g., assistance data, to other base stations, e.g., gNB2 110b, and/or to the other UEs in the group of UEs. The SRS configuration information, for example, may include information such as the SRS transmission occasions and other parameters, including the reference signal pattern, reference signal power (e.g., if different from nominal), the number of repetitions, etc.

The base stations 110 may provide the positioning measurements produced based on the common SRS resources broadcast by the target UE 105 to the location server 120. Additionally, each of the UEs, e.g., UE1 105, UE2 106a, and UE3 106b, may provide the positioning measurements produced using the common SRS resources broadcast by the other UEs to the location server 120, e.g., via a serving base station for each respective UE using a Uu interface or through another UE using a SL interface.

The positioning measurements generated by the base stations 110 and the assisting UE 106 may be RSTD related measurements for TDOA, e.g., as illustrated in FIG. 4, but with additional entities.

Figure 8:
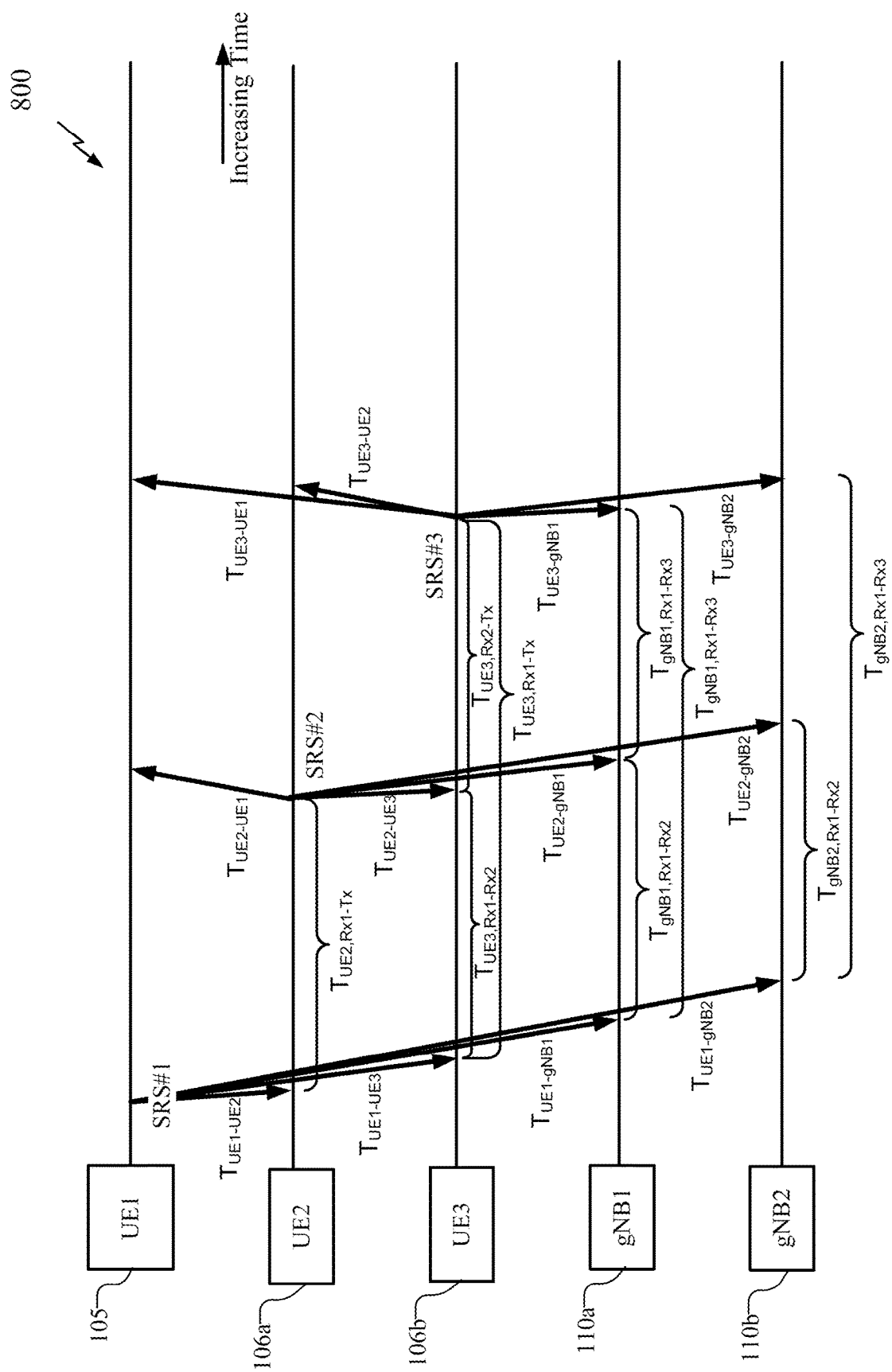
FIG. 8 illustrates a timing diagram for the broadcast of common SRS by each of a plurality of UEs for positioning of each of the UEs.

FIG. 8 illustrates a timing diagram 800 for the broadcast of common SRS by each of a plurality of UEs, e.g., UE1 105, UE2 106a, and UE3 106b for positioning of each of the UEs. As illustrated, the UE1 105 broadcasts SRS #1 (at time $T_{UE1\_Tx}$), which is received by UE2 106a, UE3 106b, gNB1 110a and gNB2 110b (at times $T_{UE2\_Rx1}$, $T_{UE3\_Rx1}$, $T_{gNB1\_Rx1}$, and $T_{gNB2\_Rx1}$, respectively). Similarly, UE2 106a broadcasts SRS #2 (at time $T_{UE2\_Tx}$), which is received by UE1 105, UE3 106b, gNB1 110a and gNB2 110b (at times $T_{UE1\_Rx2}$, $T_{UE3\_Rx2}$, $T_{gNB1\_Rx2}$, and $T_{gNB2\_Rx2}$, respectively), and UE3 106b broadcasts SRS #3 (at time $T_{UE3\_Tx}$), which is received by UE1 105, UE2 106a, gNB1 110a and gNB2 110b (at times $T_{UE1\_Rx3}$, $T_{UE2\_Rx3}$, $T_{gNB1\_Rx3}$, and $T_{gNB2\_Rx3}$, respectively). The time of flight of SRS #1, SRS #2, and SRS #3 between each node is illustrated, e.g., the time of flight of SRS #1 between UE1 and UE2 is $T_{UE1-UE2}$, the time of flight of SRS #2 between UE2 and UE1 is $T_{UE2-UE1}$, the time of flight of SRS #3 between UE3 and UE2 is $T_{UE3-UE2}$, etc.

The UE2 106a broadcasts SRS #2 after receiving SRS #1, with the Rx-Tx time difference at UE2 106a illustrated as $T_{UE2,Rx1-Tx}$. The UE3 106b broadcasts SRS #3 after receiving SRS #1, with the Rx-Tx time difference at UE3 106b illustrated as $T_{UE3,Rx1-Tx}$. The reception time differences at gNB1 110a between SRS #1 and SRS #2 is $T_{gNB2,Rx1-Rx2}$, and between SRS #1 and SRS #3 is $T_{gNB2,Rx1-Rx3}$. The reception time differences at gNB2 110b between SRS #1 and SRS #2 is $T_{gNB3,Rx1-Rx2}$, and between SRS #1 and SRS #3 is $T_{gNB3,Rx1-Rx3}$.

For each UE with an unknown position, i.e., UE1 105, SRS TDOA measurements from gNB1 110a and gNB2 110b may be obtained.

$$T_{UE1\text{-}gNB1} - T_{UE1\text{-}gNB2} = (T_{gNB1\_Rx1} - T_{UE1\_Tx}) - (T_{gNB2\_Rx1} - T_{UE1\_Tx}) = T_{gNB1\_Rx1} - T_{gNB2\_Rx1} \quad \text{eq. 5}$$

$$T_{UE2\text{-}gNB1} - T_{UE2\text{-}gNB2} = (T_{gNB1\_Rx2} - T_{UE2\_Tx}) - (T_{gNB2\_Rx2} - T_{UE2\_Tx}) = T_{gNB1\_Rx2} - T_{gNB2\_Rx2} \quad \text{eq. 6}$$

$$T_{UE3\text{-}gNB1} - T_{UE3\text{-}gNB2} = (T_{gNB1\_Rx3} - T_{UE3\_Tx}) - (T_{gNB2\_Rx3} - T_{UE3\_Tx}) = T_{gNB1\_Rx3} - T_{gNB2\_Rx3} \quad \text{eq. 7}$$

Additional sets of equations may be based on the SRS Rx-Rx time difference measurements at the gNBs and the SRS Rx-Tx measurements from other UEs.

$$T_{UE1\text{-}gNB1} + T_{gNB1,Rx1\text{-}Rx2} = T_{UE1\text{-}UE2} + T_{UE2,Rx1\text{-}Tx} + T_{UE2\text{-}gNB1} \quad \text{eq. 8}$$

$$T_{UE1\text{-}gNB1} + T_{gNB1,Rx1\text{-}Rx3} = T_{UE1\text{-}UE3} + T_{UE3,Rx1\text{-}Tx} + T_{UE3\text{-}gNB1} \quad \text{eq. 9}$$

$$T_{UE2\text{-}gNB1} + T_{gNB1,Rx2\text{-}Rx3} = T_{UE2\text{-}UE3} + T_{UE3,Rx2\text{-}Tx} + T_{UE3\text{-}gNB1} \quad \text{eq. 10}$$

Alternatively, one of the above-equations may be replaced by the SRS Rx-Rx time difference at a UE and SRS Rx-Tx time difference measurements from another UE.

$$T_{UE1\text{-}UE3} + T_{UE3,Rx1\text{-}Rx2} = T_{UE1\text{-}UE2} + T_{UE2,Rx1\text{-}Tx} + T_{UE2\text{-}UE3} \quad \text{eq. 11}$$

Thus, the position of each UE, e.g., UE1 105, UE2 106a, and UE3 106b, may be determined using the time of reception of the SRS by UEs and gNBs 110, as well as Rx-Tx time differences and Rx-Rx time differences, which may be reported by the UEs, e.g., UE1 105, UE2 106a, UE3 106b, and gNBs 110 to a positioning entity, such as a location server 120 or UE 105.

For the above-described implementation, there are six equations with six variables corresponding to the three unknown positions of the UEs, however, the solution may not be unique. Moreover, even with additional UEs with unknown positions are added and corresponding additional SRS measurements produces, the solution may not be unique.

Figure 9:
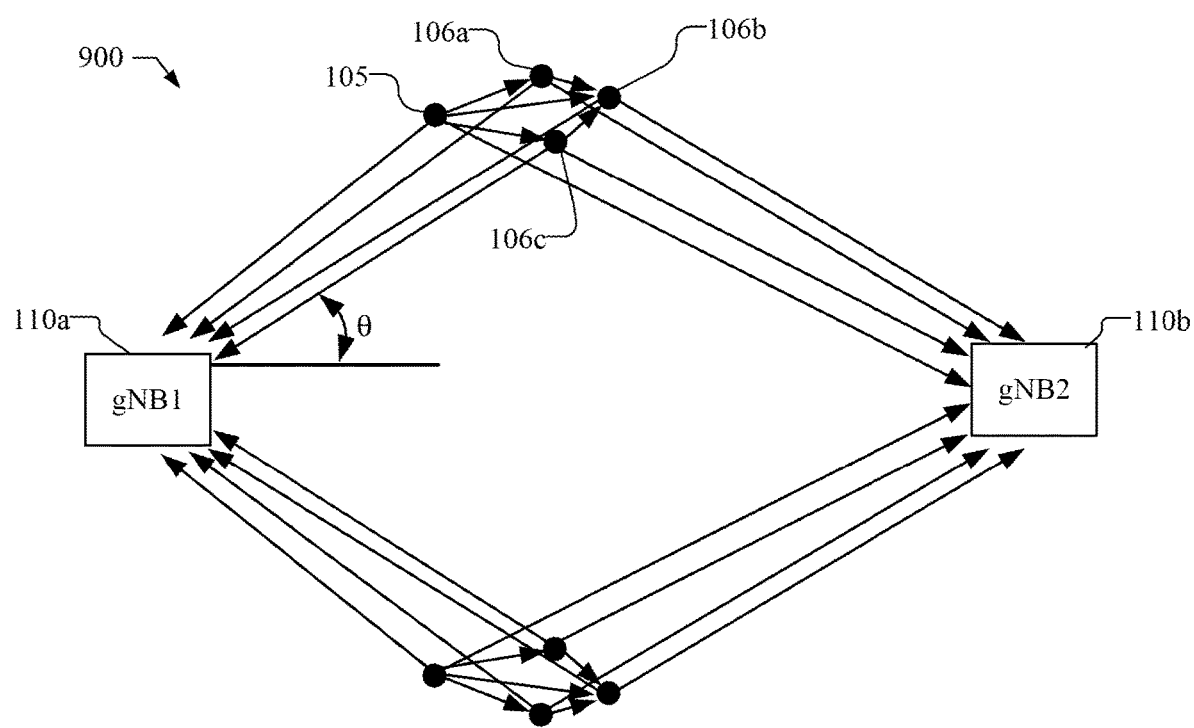
FIG. 9 illustrates a system in which there is mirror symmetry in a positioning solution, which is resolved using an angular measurement.

FIG. 9, by way of example, illustrates a system 900 in which there are four UEs with unknown positions, illustrated by dots 105, 106a, 106b, and 106c, and two gNBs, gNB1 110a and gNB2 110b. As illustrated in FIG. 9, the resulting solution for position of the UEs is not unique due to mirror symmetry, which is not resolved through the equations generated above. For example, for any number of distance based measurements from two anchor nodes, e.g., gNB1 110a and gNB2 110b and SRS measurements between UEs with unknown positions, the mirror symmetry will not be solved.

Accordingly, in one implementation, at least one angular measurement, e.g., UL AOA or DL-AOD, between one of the UEs and one of the gNBs, illustrated as θ, may be used to resolve the mirror symmetry to obtain a unique position solution for all of the UEs with unknown positions.

Figure 10:
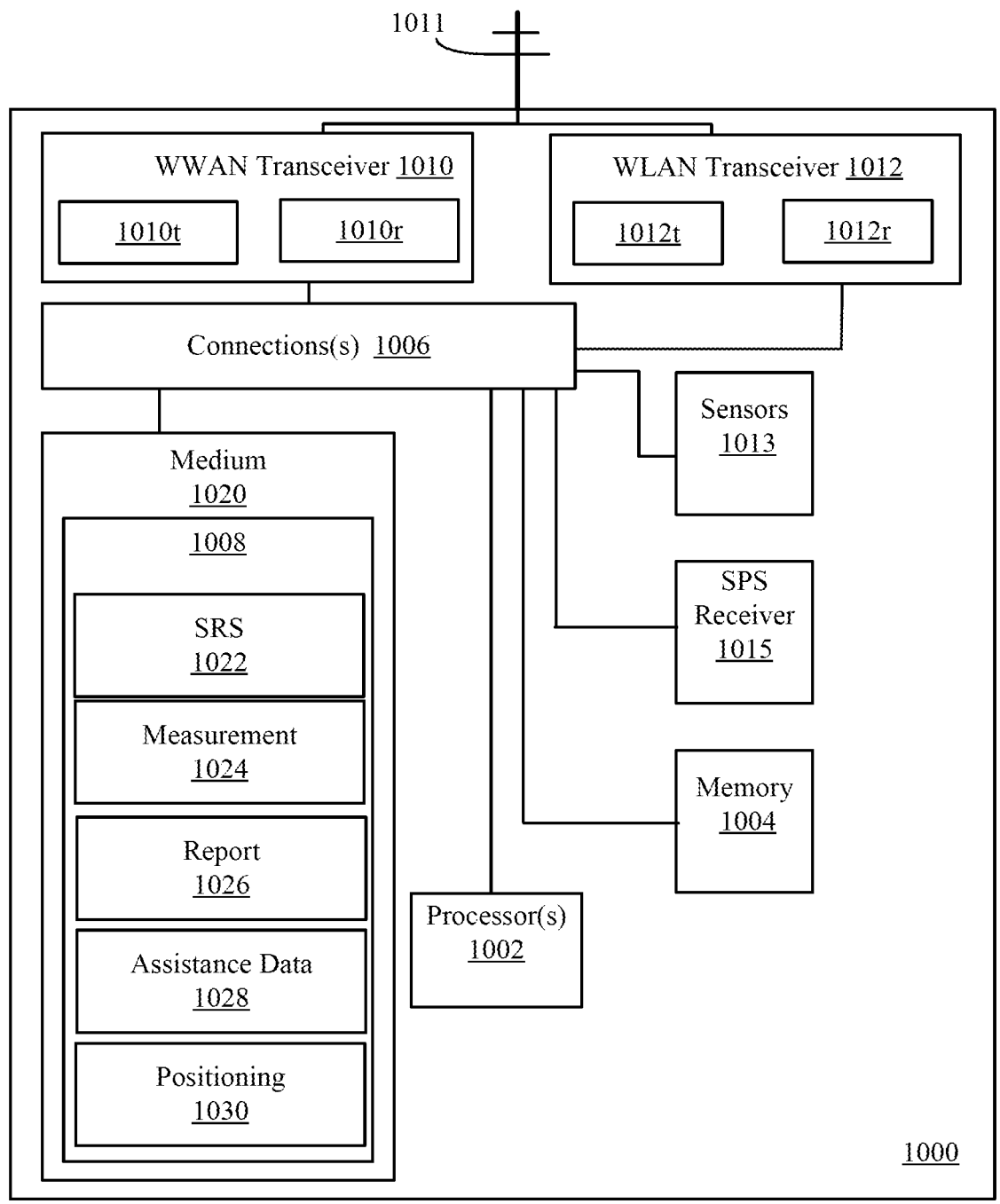
FIG. 10 shows a schematic block diagram illustrating certain exemplary features of a hardware implementation of a UE that is configured to support UE positioning using common SRS for positioning broadcast by one or more UEs.

FIG. 10 shows a schematic block diagram illustrating certain exemplary features of a UE 1000, e.g., which may be UE 105 or UE 106 shown in FIGS. 1A, 3-5, and 7-9, that is configured to support position determination of a UE using broadcast common SRS, as discussed herein. The UE 1000, for example, may perform the process flow shown in FIGS. 13 and 14 and algorithms disclosed herein. The UE 1000 may, for example, include one or more processors 1002, memory 1004, an external interface such as at least one wireless transceiver (e.g., wireless network interface) illustrated as Wireless Wide Area Network (WWAN) transceiver 1010 and Wireless Local Area Network (WLAN) transceiver 1012, SPS receiver 1015, and one or more sensors 1013, which may be operatively coupled with one or more connections 1006 (e.g., buses, lines, fibers, links, etc.) to non-transitory computer readable medium 1020 and memory 1004. The wireless transceiver (e.g. WWAN transceiver 1010 and/or WLAN transceiver 1012) may further include transceivers for Wireless Personal Area Network (WPAN), Wireless Metropolitan Area Network (WMAN), etc. The SPS receiver 1015, for example, may receive and process SPS signals from SVs 190 shown in FIG. 1A. The one or more sensors 1013, for example, may include a barometer and/or an inertial measurement unit (IMU) that may include one or more accelerometers, one or more gyroscopes, a magnetometer, etc. The UE 1000 may further include additional items, which are not shown, such as a user interface that may include e.g., a display, a keypad or other input device, such as virtual keypad on the display, through which a user may interface with the UE. In certain example implementations, all or part of UE 1000 may take the form of a chipset, and/or the like.

The at least one wireless transceiver may be a transceiver 1010 for a WWAN communication system and a transceiver 1012 for a WLAN communication system, or may be a combined transceiver for both WWAN and WLAN. The WWAN transceiver 1010 may include a transmitter 1010t and receiver 1010r coupled to one or more antennas 1011 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The WLAN transceiver 1012 may include a transmitter 1012t and receiver 1012r coupled to one or more antennas 1011 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The transmitters 1010t and 1012t may include multiple transmitters that may be discrete components or combined/integrated components, and/or the receivers 1010r and 1012r may include multiple receivers that may be discrete components or combined/integrated components. The WWAN transceiver 1010 may be configured to communicate signals (e.g., with base stations and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), etc. New Radio (NR) may use mm-wave frequencies and/or sub-6 GHz frequencies. The WLAN transceiver 1012 may be configured to communicate signals (e.g., with access points and/or one or more other devices) according to a variety of radio access technologies (RATs) such as 3GPP LTE-V2X (PC5), IEEE 802.11 (including IEEE 802.11p), WiFi, WiFi Direct (WiFi-D), Bluetooth®, Zigbee etc. The wireless transceivers 1010 and 1012 may be communicatively coupled to a transceiver interface, e.g., by optical and/or electrical connection, which may be at least partially integrated with the wireless transceivers 1010 and 1012.

In some embodiments, UE 1000 may include antenna 1011, which may be internal or external. UE antenna 1011 may be used to transmit and/or receive signals processed by wireless transceivers 1010 and 1012. In some embodiments, UE antenna 1011 may be coupled to wireless transceivers 1010 and 1012. In some embodiments, measurements of signals received (transmitted) by UE 1000 may be performed at the point of connection of the UE antenna 1011 and wireless transceivers 1010 and 1012. For example, the measurement point of reference for received (transmitted) RF signal measurements may be an input (output) terminal of the receiver 1010r (transmitter 1010t) and an output (input) terminal of the UE antenna 1011. In a UE 1000 with multiple UE antennas 1011 or antenna arrays, the antenna connector may be viewed as a virtual point representing the aggregate output (input) of multiple UE antennas. In some embodiments, UE 1000 may measure received signals including signal strength and TOA measurements and the raw measurements may be processed by the one or more processors 1002.

The one or more processors 1002 may be implemented using a combination of hardware, firmware, and software. For example, the one or more processors 1002 may be configured to perform the functions discussed herein by implementing one or more instructions or program code 1008 on a non-transitory computer readable medium, such as medium 1020 and/or memory 1004. In some embodiments, the one or more processors 1002 may represent one or more circuits configurable to perform at least a portion of a data signal computing procedure or process related to the operation of UE 1000.

The medium 1020 and/or memory 1004 may store instructions or program code 1008 that contain executable code or software instructions that when executed by the one or more processors 1002 cause the one or more processors 1002 to operate as a special purpose computer programmed to perform the techniques disclosed herein. As illustrated in UE 1000, the medium 1020 and/or memory 1004 may include one or more components or modules that may be implemented by the one or more processors 1002 to perform the methodologies described herein. While the components or modules are illustrated as software in medium 1020 that is executable by the one or more processors 1002, it should be understood that the components or modules may be stored in memory 1004 or may be dedicated hardware either in the one or more processors 1002 or off the processors.

A number of software modules and data tables may reside in the medium 1020 and/or memory 1004 and be utilized by the one or more processors 1002 in order to manage both communications and the functionality described herein. It should be appreciated that the organization of the contents of the medium 1020 and/or memory 1004 as shown in UE 1000 is merely exemplary, and as such the functionality of the modules and/or data structures may be combined, separated, and/or be structured in different ways depending upon the implementation of the UE 1000.

The medium 1020 and/or memory 1004 may include an SRS module 1022 that when implemented by the one or more processors 1002 configures the one or more processors 1002 to broadcast, via the wireless transceiver 1010, a common SRS for positioning to base station and other UEs for position measurements. The one or more processors 1002 may be further configured to receive SRS from other UEs.

The medium 1020 and/or memory 1004 may include a measurement module 1024 that when implemented by the one or more processors 1002 configures the one or more processors 1002 to measure SRS, e.g., the time of transmission of SRS, the time of reception of SRS, the Rx-Tx time difference for received and transmitted SRS, or the Rx-Rx time difference for received SRS. The one or more processors 1102 may be configured to generate a measurement report for the measured SRS resources.

The medium 1020 and/or memory 1004 may include a report module 1026 that when implemented by the one or more processors 1002 configures the one or more processors 1002 to send, via the wireless transceiver 1010, a measurement report to a location server. The one or more processors 1002 may be configured to receive, via the wireless transceiver 1010, measurement reports from other entities, including base stations and other UEs.

The medium 1020 and/or memory 1004 may include an assistance data module 1028 that when implemented by the one or more processors 1002 configures the one or more processors 1002 to receive, via the wireless transceiver 1010, from a serving base station or location server assistance data for SRS for positioning to be received from other UEs. The assistance data, for example, may include, SRS transmission occasions reference signal pattern, reference signal power (e.g., if different from nominal), the number of repetitions, etc.

The medium 1020 and/or memory 1004 may include a positioning module 1030 that when implemented by the one or more processors 1002 configures the one or more processors 1002 to determine a position of the UE and optionally other UEs, based on measurement reports, e.g., using TDOA, or other techniques discussed herein.

The methodologies described herein may be implemented by various means depending upon the application. For example, these methodologies may be implemented in hardware, firmware, software, or any combination thereof. For a hardware implementation, the one or more processors 1002 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1020 or memory 1004 that is connected to and executed by the one or more processors 1002. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1008 on a non-transitory computer readable medium, such as medium 1020 and/or memory 1004. Examples include computer readable media encoded with a data structure and computer readable media encoded with a computer program code 1008. For example, the non-transitory computer readable medium including program code 1008 stored thereon may include program code 1008 to support positioning of the UE 105 using UL SRS for positioning to one or more RPs in a manner consistent with disclosed embodiments. Non-transitory computer readable medium 1020 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1008 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1020, instructions and/or data may be provided as signals on transmission media included in a communication apparatus. For example, a communication apparatus may include a wireless transceiver 1010 having signals indicative of instructions and data. The instructions and data are configured to cause one or more processors to implement the functions outlined in the claims. That is, the communication apparatus includes transmission media with signals indicative of information to perform disclosed functions.

Memory 1004 may represent any data storage mechanism. Memory 1004 may include, for example, a primary memory and/or a secondary memory. Primary memory may include, for example, a random access memory, read only memory, etc. While illustrated in this example as being separate from one or more processors 1002, it should be understood that all or part of a primary memory may be provided within or otherwise co-located/coupled with the one or more processors 1002. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1020. As such, in certain example implementations, the methods and/or apparatuses presented herein may take the form in whole or part of a computer readable medium 1020 that may include computer implementable program code 1008 stored thereon, which if executed by one or more processors 1002 may be operatively enabled to perform all or portions of the example operations as described herein. Computer readable medium 1020 may be a part of memory 1004.

Figure 11:
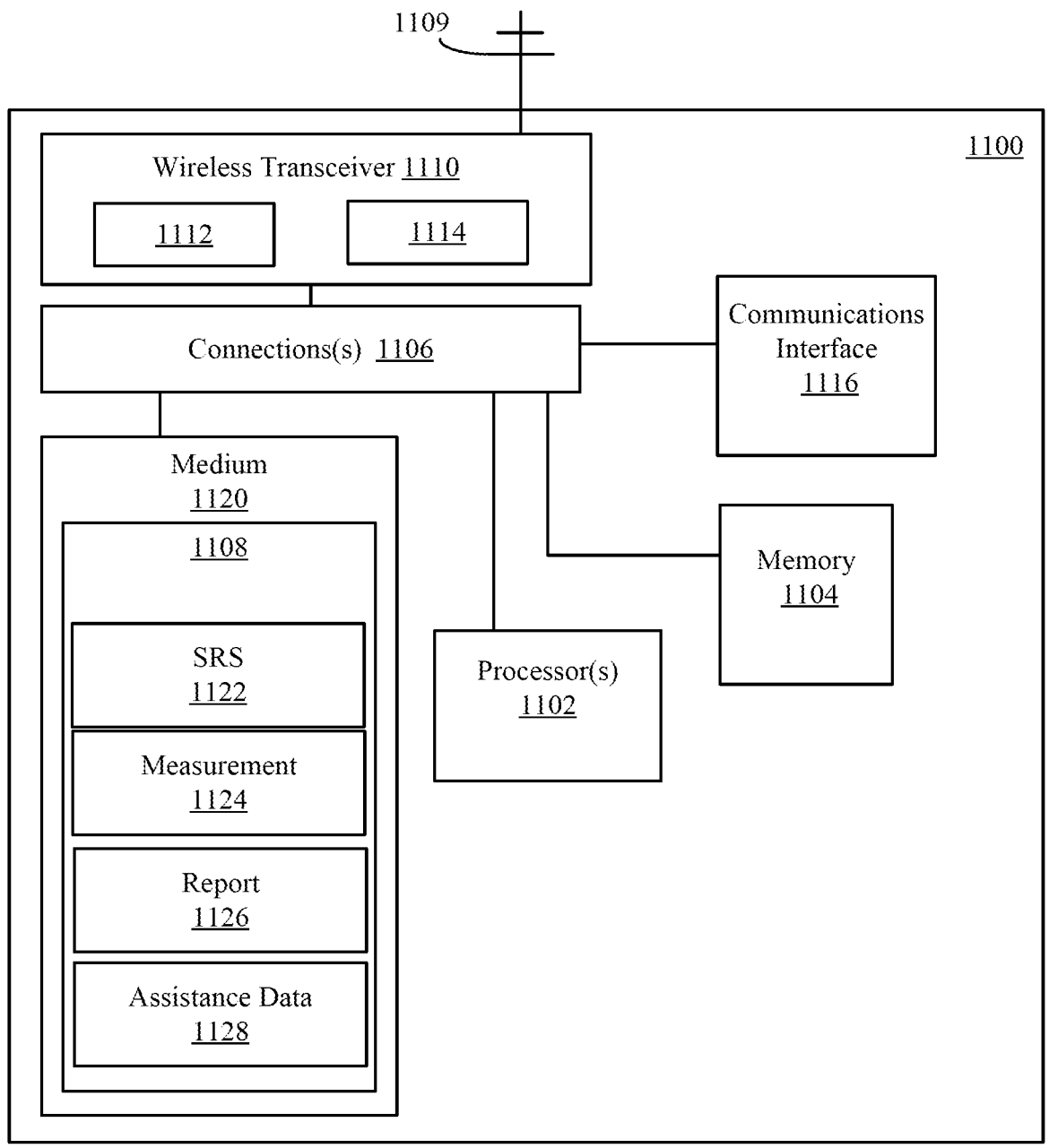
FIG. 11 shows a schematic block diagram illustrating certain exemplary features of a hardware implementation of a base station that is configured to support UE positioning using common SRS for positioning broadcast by one or more UEs.

FIG. 11 shows a schematic block diagram illustrating certain exemplary features of a base station 1100 that is configured to support UE positioning using common SRS for positioning broadcast by one or more UEs, as discussed herein. The base station 1100, for example, may be a base station, such as gNB 110 shown in 1A, 1B, 3-5, and 7-9. The base station 1100, for example, may include one or more processors 1102, memory 1104, and an external interface, which may include a wireless transceiver 1110 for wirelessly communicating with UEs and/or a communications interface 1116 for communicating with other network entities. The one or more processors 1102, memory 1104, wireless transceiver 1110, and communications interface 1116 may be operatively coupled with one or more connections 1106 (e.g., buses, lines, fibers, links, etc.) to non-transitory computer readable medium 1120 and memory 1104. The wireless transceiver 1110 may be a transceiver for communicating with the UE 105. The wireless transceiver 1110 may include a transmitter 1112 and receiver 1114 coupled to one or more antennas 1109 for transmitting (e.g., on one or more downlink channels) and/or receiving (e.g., on one or more uplink channels) wireless signals and transducing signals from the wireless signals to wired (e.g., electrical and/or optical) signals and from wired (e.g., electrical and/or optical) signals to the wireless signals. The communications interface 1116 may be wireline or wireless network interface between network entities, such as to the AMF 115 through which the network entity may communicate with the LMF 120. In certain example implementations, all or part of base station 1100 may take the form of a chipset, and/or the like.

The one or more processors 1102 may be implemented using a combination of hardware, firmware, and software. For example, the one or more processors 1102 may be configured to perform the functions discussed herein by implementing one or more instructions or program code 1108 on a non-transitory computer readable medium, such as medium 1120 and/or memory 1104. In some embodiments, the one or more processors 1102 may represent one or more circuits configurable to perform at least a portion of a data signal computing procedure or process related to the operation of base station 1100.

The medium 1120 and/or memory 1104 may store instructions or program code 1108 that contain executable code or software instructions that when executed by the one or more processors 1102 cause the one or more processors 1102 to operate as a special purpose computer programmed to perform the techniques disclosed herein. As illustrated in base station 1100, the medium 1120 and/or memory 1104 may include one or more components or modules that may be implemented by the one or more processors 1102 to perform the methodologies described herein. While the components or modules are illustrated as software in medium 1120 that is executable by the one or more processors 1102, it should be understood that the components or modules may be stored in memory 1104 or may be dedicated hardware either in the one or more processors 1102 or off the processors.

A number of software modules and data tables may reside in the medium 1120 and/or memory 1104 and be utilized by the one or more processors 1102 in order to manage both communications and the functionality described herein. It should be appreciated that the organization of the contents of the medium 1120 and/or memory 1104 as shown in base station 1100 is merely exemplary, and as such the functionality of the modules and/or data structures may be combined, separated, and/or be structured in different ways depending upon the implementation of the base station 1100.

The medium 1120 and/or memory 1104 may include an SRS module 1122 that when implemented by the one or more processors 1102 configures the one or more processors 1102 to receive, via the wireless transceiver 1110, a common SRS for positioning broadcast by one or more UEs for position measurements.

The medium 1120 and/or memory 1104 may include a measurement module 1124 that when implemented by the one or more processors 1102 configures the one or more processors 1102 to measure SRS, e.g., the time of reception of SRS or the Rx-Rx time difference for received SRS. The one or more processors 1102 may be configured to generate a measurement report for the measured SRS resources.

The medium 1120 and/or memory 1104 may include a report module 1126 that when implemented by the one or more processors 1102 configures the one or more processors 1102 to send, via the wireless transceiver 1110 or communications interface 1116, a measurement report to a positioning entity, such as a location server or a UE. The one or more processors 1102 may be configured to receive, via the wireless transceiver 1110, measurement reports from other entities, including base stations and other UEs, which may be sent to the positioning entity.

The medium 1120 and/or memory 1104 may include an assistance data module 1128 that when implemented by the one or more processors 1102 configures the one or more processors 1102 to send, via the wireless transceiver 1110, to a UE or other base stations assistance data for SRS for positioning to be received from UEs. The assistance data, for example, may include, SRS transmission occasions reference signal pattern, reference signal power (e.g., if different from nominal), the number of repetitions, etc.

The methodologies described herein may be implemented by various means depending upon the application. For example, these methodologies may be implemented in hardware, firmware, software, or any combination thereof. For a hardware implementation, the one or more processors 1102 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1120 or memory 1104 that is connected to and executed by the one or more processors 1102. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1108 on a non-transitory computer readable medium, such as medium 1120 and/or memory 1104. Examples include computer readable media encoded with a data structure and computer readable media encoded with a computer program code 1108. For example, the non-transitory computer readable medium including program code 1108 stored thereon may include program code 1108 to support positioning of the UE 105 using UL SRS for positioning to one or more RPs in a manner consistent with disclosed embodiments. Non-transitory computer readable medium 1120 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1108 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1120, instructions and/or data may be provided as signals on transmission media included in a communication apparatus. For example, a communication apparatus may include a wireless transceiver 1110 or communications interface 1116 having signals indicative of instructions and data. The instructions and data are configured to cause one or more processors to implement the functions outlined in the claims. That is, the communication apparatus includes transmission media with signals indicative of information to perform disclosed functions.

Memory 1104 may represent any data storage mechanism. Memory 1104 may include, for example, a primary memory and/or a secondary memory. Primary memory may include, for example, a random access memory, read only memory, etc. While illustrated in this example as being separate from one or more processors 1102, it should be understood that all or part of a primary memory may be provided within or otherwise co-located/coupled with the one or more processors 1102. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1120. As such, in certain example implementations, the methods and/or apparatuses presented herein may take the form in whole or part of a computer readable medium 1120 that may include computer implementable program code 1108 stored thereon, which if executed by one or more processors 1102 may be operatively enabled to perform all or portions of the example operations as described herein. Computer readable medium 1120 may be a part of memory 1104.

Figure 12:
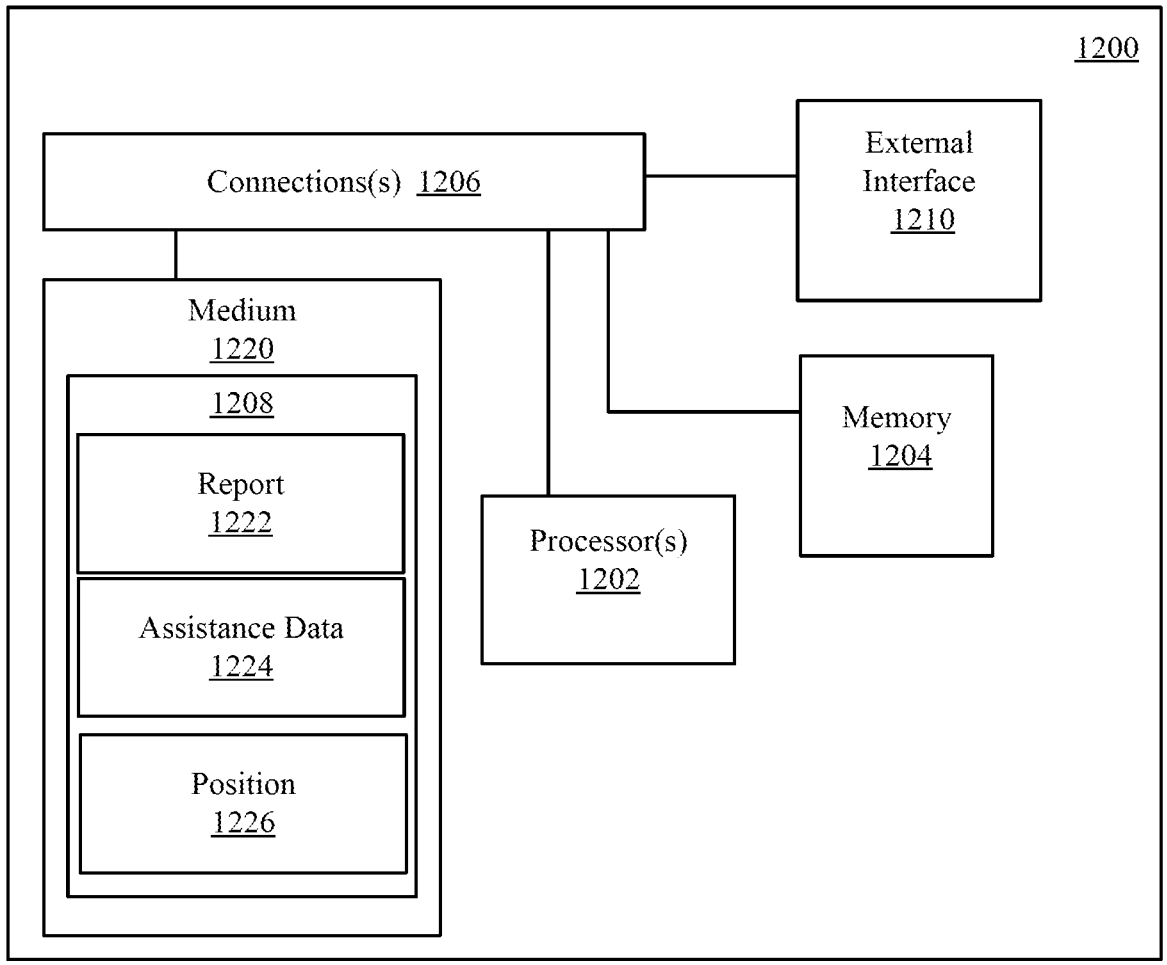
FIG. 12 shows a schematic block diagram illustrating certain exemplary features of a hardware implementation of a location server that is configured to support UE positioning using common SRS for positioning broadcast by one or more UEs.

FIG. 12 shows a schematic block diagram illustrating certain exemplary features of a location server 1200 that is configured to support UE positioning using common SRS for positioning broadcast by one or more UEs, as discussed herein. The location server 1200, for example, may be a LMF 120 shown in FIGS. 1A, 3, and 7. The location server 1200 may, for example, include one or more processors 1202, memory 1204, an external interface 1210 (e.g., wireline or wireless network interface to base stations and/or entities in the core network), which may be operatively coupled with one or more connections 1206 (e.g., buses, lines, fibers, links, etc.) to non-transitory computer readable medium 1220 and memory 1204. In certain example implementations, all or part of location server 1200 may take the form of a chipset, and/or the like.

The one or more processors 1202 may be implemented using a combination of hardware, firmware, and software. For example, the one or more processors 1202 may be configured to perform the functions discussed herein by implementing one or more instructions or program code 1208 on a non-transitory computer readable medium, such as medium 1220 and/or memory 1204. In some embodiments, the one or more processors 1202 may represent one or more circuits configurable to perform at least a portion of a data signal computing procedure or process related to the operation of location server 1200.

The medium 1220 and/or memory 1204 may store instructions or program code 1208 that contain executable code or software instructions that when executed by the one or more processors 1202 cause the one or more processors 1202 to operate as a special purpose computer programmed to perform the techniques disclosed herein. As illustrated in location server 1200, the medium 1220 and/or memory 1204 may include one or more components or modules that may be implemented by the one or more processors 1202 to perform the methodologies described herein. While the components or modules are illustrated as software in medium 1220 that is executable by the one or more processors 1202, it should be understood that the components or modules may be stored in memory 1204 or may be dedicated hardware either in the one or more processors 1202 or off the processors.

A number of software modules and data tables may reside in the medium 1220 and/or memory 1204 and be utilized by the one or more processors 1202 in order to manage both communications and the functionality described herein. It should be appreciated that the organization of the contents of the medium 1220 and/or memory 1204 as shown in location server 1200 is merely exemplary, and as such the functionality of the modules and/or data structures may be combined, separated, and/or be structured in different ways depending upon the implementation of the location server 1200.

The medium 1220 and/or memory 1204 may include a report module 1222 that when implemented by the one or more processors 1202 configures the one or more processors 1202 to receive, via the external interface 1210, measurement reports from base stations and UEs including measurements for common SRS broadcast by one or more UEs and measured by the base stations and UEs.

The medium 1220 and/or memory 1204 may include an assistance data module 1224 that when implemented by the one or more processors 1202 configures the one or more processors 1202 to send, via the external interface 1210, to UEs and base stations assistance data for broadcast SRS for positioning to be received from other UEs. The assistance data, for example, may include, SRS transmission occasions reference signal pattern, reference signal power (e.g., if different from nominal), the number of repetitions, etc.

The medium 1220 and/or memory 1204 may include a positioning module 1226 that when implemented by the one or more processors 1202 configures the one or more processors 1202 to determine a position of the UE and optionally other UEs, based on measurement reports, e.g., using TDOA, or other techniques discussed herein.

The methodologies described herein may be implemented by various means depending upon the application. For example, these methodologies may be implemented in hardware, firmware, software, or any combination thereof. For a hardware implementation, the one or more processors 1202 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1220 or memory 1204 that is connected to and executed by the one or more processors 1202. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1208 on a non-transitory computer readable medium, such as medium 1220 and/or memory 1204. Examples include computer readable media encoded with a data structure and computer readable media encoded with a computer program code 1208. For example, the non-transitory computer readable medium including program code 1208 stored thereon may include program code 1208 to support positioning of the UE 105 using UL SRS for positioning to one or more RPs in a manner consistent with disclosed embodiments. Non-transitory computer readable medium 1220 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1208 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1220, instructions and/or data may be provided as signals on transmission media included in a communication apparatus. For example, a communication apparatus may include an external interface 1210 having signals indicative of instructions and data. The instructions and data are configured to cause one or more processors to implement the functions outlined in the claims. That is, the communication apparatus includes transmission media with signals indicative of information to perform disclosed functions.

Memory 1204 may represent any data storage mechanism. Memory 1204 may include, for example, a primary memory and/or a secondary memory. Primary memory may include, for example, a random access memory, read only memory, etc. While illustrated in this example as being separate from one or more processors 1202, it should be understood that all or part of a primary memory may be provided within or otherwise co-located/coupled with the one or more processors 1202. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1220. As such, in certain example implementations, the methods and/or apparatuses presented herein may take the form in whole or part of a computer readable medium 1220 that may include computer implementable program code 1208 stored thereon, which if executed by one or more processors 1202 may be operatively enabled to perform all or portions of the example operations as described herein. Computer readable medium 1220 may be a part of memory 1204.

Figure 13:
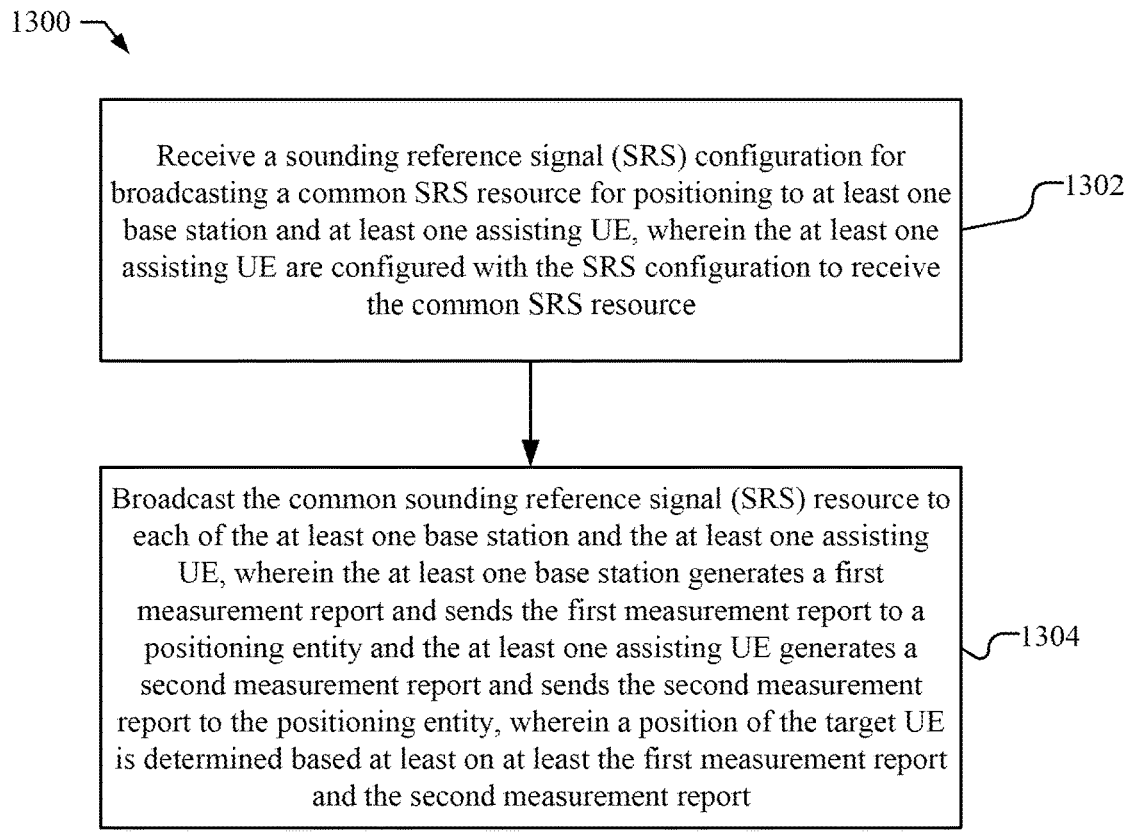
FIG. 13 shows a flowchart for an exemplary method performed by a target UE to support positioning of the target UE.

FIG. 13 shows a flowchart for an exemplary method 1300, e.g., performed by a target UE, such as UE 105, shown in FIGS. 1A, 3, 4, 5, 7, 8, 9, and 10, to support positioning of the target UE, in a manner consistent with disclosed implementation.

At block 1302, the target UE receives a sounding reference signal (SRS) configuration for broadcasting a common SRS resource for positioning to at least one base station and at least one assisting UE, wherein the at least one assisting UE are configured with the SRS configuration to receive the common SRS resource, e.g., as discussed in FIGS. 3, 5, 7, and 8. A means for receiving a sounding reference signal (SRS) configuration for broadcasting a common SRS resource for positioning to at least one base station and at least one assisting UE, wherein the at least one assisting UE are configured with the SRS configuration to receive the common SRS resource may be, e.g., the wireless transceiver 1010 and one or more processors 1002 with dedicated hardware or implementing executable code or software instructions in memory 1004 and/or medium 1020 such as the SRS module 1022 of UE 1000.

At block 1304, the target UE broadcasts the common sounding reference signal (SRS) resource to each of the at least one base station and the at least one assisting UE, wherein the at least one base station generates a first measurement report and sends the first measurement report to a positioning entity and the at least one assisting UE generates a second measurement report and sends the second measurement report to the positioning entity, wherein a position of the target UE is determined based at least on at least the first measurement report and the second measurement report, e.g., as discussed in reference to FIGS. 5 and 8. A means for broadcasting the common sounding reference signal (SRS) resource to each of the at least one base station and the at least one assisting UE, wherein the at least one base station generates a first measurement report and sends the first measurement report to a positioning entity and the at least one assisting UE generates a second measurement report and sends the second measurement report to the positioning entity, wherein a position of the target UE is determined based at least on at least the first measurement report and the second measurement report may be, e.g., the wireless transceiver 1010 and one or more processors 1002 with dedicated hardware or implementing executable code or software instructions in memory 1004 and/or medium 1020 such as the SRS module 1022 of UE 1000.

In one implementation, the position of the target UE is determined using Time Difference of Arrival (TDOA), and the first measurement report and the second measurement report comprise Reference Signal Time Difference (RSTD) measurements for the target UE generated based on the time of reception of the common SRS resource, e.g., as discussed in reference to FIGS. 5 and 8.

In one implementation, the position of the at least one assisting UE may be known, e.g., as discussed in reference to FIG. 5.

In one implementation, a position of an assisting UE is unknown, and wherein the position of the assisting UE is determined based at least on the first measurement report and the second measurement report, e.g., as discussed in reference to FIG. 8. For example, in one implementation, the target UE may receive a second common SRS resource broadcast by the assisting UE to the target UE and the at least one base station, and may generate a third measurement report for the second common SRS resource, wherein the position of the target UE and the assisting UE are determined based at least on the first measurement report, the second measurement report, and the third measurement report, e.g., as discussed in reference to FIG. 8. A means for receiving a second common SRS resource broadcast by the assisting UE to the target UE and the at least one base station, and a means for generating a third measurement report for the second common SRS resource, wherein the position of the target UE and the assisting UE are determined based at least on the first measurement report, the second measurement report, and the third measurement report may be, e.g., the wireless transceiver 1010 and one or more processors 1002 with dedicated hardware or implementing executable code or software instructions in memory 1004 and/or medium 1020 such as the SRS module 1022 and measurement module 1024 of UE 1000. In one example, the at least one base station generates an angular measurement of one of the common SRS resource and the second common SRS resource and sends the angular measurement to the positioning entity, wherein the positions of the target UE and the assisting UE are determined further based on the angular measurement, e.g., as discussed in reference to FIG. 9.

In one implementation, the target UE may receive a second common SRS resource from an assisting UE, and generates a third measurement report for the second common SRS resource, wherein the position of the target UE is determined based at least on the first measurement report, the second measurement report, and the third measurement report, e.g., as discussed in reference to FIG. 5 and FIG. 8. A means for receiving a second common SRS resource from an assisting UE, and means for generating a third measurement report for the second common SRS resource, wherein the position of the target UE is determined based at least on the first measurement report, the second measurement report, and the third measurement report may be, e.g., the wireless transceiver 1010 and one or more processors 1002 with dedicated hardware or implementing executable code or software instructions in memory 1004 and/or medium 1020 such as the SRS module 1022 and measurement module 1024 of UE 1000.

In one implementation, the positioning entity may be a location server. The target entity may send the third measurement report to the location server, e.g., as discussed in reference to FIG. 5 and FIG. 8. A means for sending the third measurement report to the location server may be, e.g., the wireless transceiver 1010 and one or more processors 1002 with dedicated hardware or implementing executable code or software instructions in memory 1004 and/or medium 1020 such as the report module 1026 of UE 1000.

In one implementation, the positioning entity may be the target UE, e.g., as discussed in reference to FIG. 5 and FIG. 8.

Figure 14:
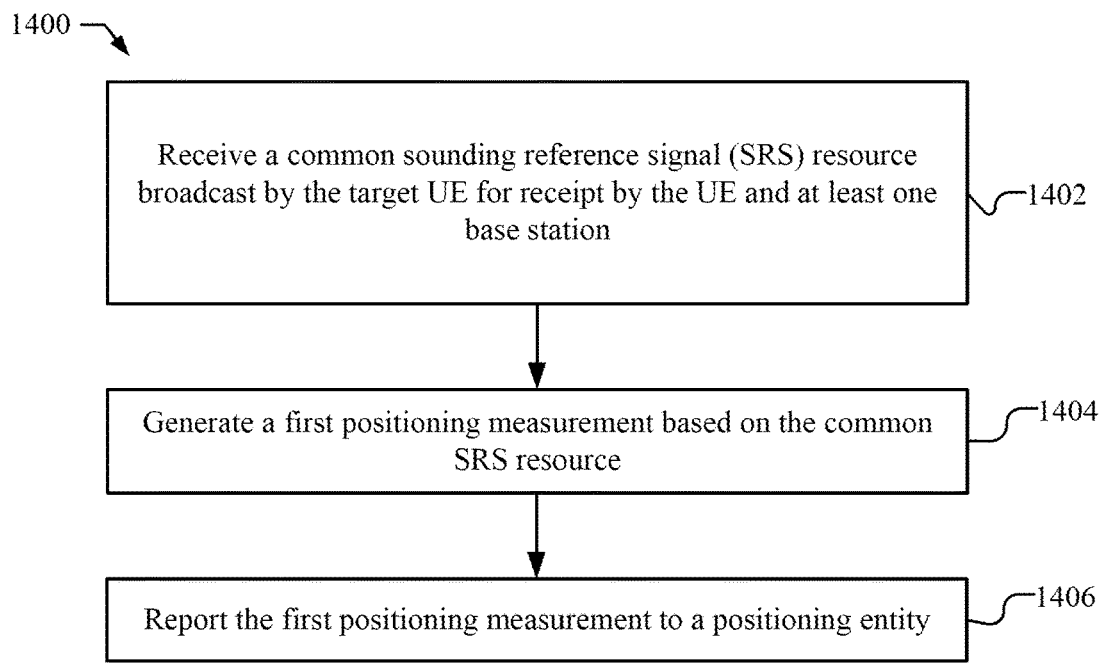
FIG. 14 shows a flowchart for an exemplary method performed by a UE to support positioning of a target UE.

FIG. 14 shows a flowchart for an exemplary method 1400, e.g., performed by a UE, such as UE 106, shown in FIGS. 1A, 3, 4, 5, 10, 8, 9, and 10, to support positioning of a target UE, such as UE 105, in a manner consistent with disclosed implementation.

At block 1402, the UE receives a common sounding reference signal (SRS) resource broadcast by the target UE for receipt by the UE and at least one base station, e.g., as discussed in reference to FIG. 5 and FIG. 8. A means for receiving a common sounding reference signal (SRS) resource broadcast by the target UE for receipt by the UE and at least one base station may be, e.g., the wireless transceiver 1010 and one or more processors 1002 with dedicated hardware or implementing executable code or software instructions in memory 1004 and/or medium 1020 such as the SRS module 1022 of UE 1000.

At block 1404, the UE generates a first positioning measurement based on the common SRS resource, e.g., as discussed in reference to FIG. 5 and FIG. 8. A means for generating a first positioning measurement based on the common SRS resource may be, e.g., the wireless transceiver 1010 and one or more processors 1002 with dedicated hardware or implementing executable code or software instructions in memory 1004 and/or medium 1020 such as the positioning measurement module 1024 of UE 1000.

At block 1406, the UE reports the first positioning measurement to a positioning entity, e.g., as discussed in reference to FIG. 5 and FIG. 8. A means for reporting the first positioning measurement to a positioning entity may be, e.g., the wireless transceiver 1010 and one or more processors 1002 with dedicated hardware or implementing executable code or software instructions in memory 1004 and/or medium 1020 such as the report module 1026 of UE 1000.

In one implementation, the at least one base station generates a second positioning measurement first positioning measurement based on the common SRS resource and sends the second positioning measurement first positioning measurement to the positioning entity, wherein the positioning entity determines a position of the target UE based on the first positioning measurement and the second positioning measurement first positioning measurement, e.g., as discussed in reference to FIG. 5 and FIG. 8.

In one implementation, the position of the target UE is determined using Time Difference of Arrival (TDOA), and the first positioning measurement comprises a Reference Signal Time Difference (RSTD) measurement for the target UE generated based on the common SRS resource, e.g., as discussed in reference to FIG. 5 and FIG. 8.

In one implementation, the UE may receive assistance data for the common SRS resource, wherein the assistance data is used for receiving the common SRS resource, e.g., as discussed in reference to FIG. 3 and FIG. 10. A means for receiving assistance data for the common SRS resource, wherein the assistance data is used for receiving the common SRS resource may be, e.g., the wireless transceiver 1010 and one or more processors 1002 with dedicated hardware or implementing executable code or software instructions in memory 1004 and/or medium 1020 such as the assistance data module 1028 of UE 1000.

In one implementation, the position of the UE may be known, e.g., as discussed in reference to FIG. 5.

In one implementation, the position of the UE may be unknown, and wherein the position of the UE is determined based at least on the first positioning measurement, e.g., as discussed in reference to FIG. 8.

In one implementation, the UE may broadcast a second common SRS resource to be received by the target UE and the at least one base station, wherein the first positioning measurement is based on the common SRS resource and the second common SRS resource, e.g., as discussed in reference to FIG. 5 and FIG. 8. A means for broadcasting a second common SRS resource to be received by the target UE and the at least one base station, wherein the first positioning measurement is based on the common SRS resource and the second common SRS resource may be, e.g., the wireless transceiver 1010 and one or more processors 1002 with dedicated hardware or implementing executable code or software instructions in memory 1004 and/or medium 1020 such as the SRS module 1022 of UE 1000. In one example, the at least one base station generates an angular measurement of one of the common SRS resource and the second common SRS resource and sends the angular measurement to the positioning entity, wherein the positions of the target UE and the UE are determined further based on the angular measurement, e.g., as discussed in reference to FIG. 9.

In one implementation, the positioning entity may be one of a location server and the target UE, e.g., as discussed in reference to FIG. 5 and FIG. 8.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device". "wireless device" or "user equipment") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, a "mobile station" or "user equipment" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station" or "user equipment." A mobile device or user equipment (UE) may also be referred to as a mobile terminal, a terminal, a device, a Secure User Plane Location Enabled Terminal (SET), a target device, a target, or by some other name.

In an embodiment, a first example independent claim may include a method for supporting location of a user equipment (UE) at a first wireless node, comprising receiving a first request for broadcast of an increased quantity of location-related information, the broadcast based on a wireless access type for the first wireless node; and broadcasting the increased quantity of location-related information using the wireless access type and based on the first request.

While some of the techniques, processes, and/or implementations presented herein may comply with all or part of one or more standards, such techniques, processes, and/or implementations may not, in some embodiments, comply with part or all of such one or more standards.

In view of this description embodiments may include different combinations of features. Implementation examples are described in the following numbered clauses:

Clause 1. A method performed by a target user equipment (UE) for supporting positioning of the target UE, comprising: receiving a sounding reference signal (SRS) configuration for broadcasting a common SRS resource for positioning to at least one base station and at least one assisting UE, wherein the at least one assisting UE are configured with the SRS configuration to receive the common SRS resource; and broadcasting the common sounding reference signal (SRS) resource to each of the at least one base station and the at least one assisting UE, wherein the at least one base station generates a first measurement report and sends the first measurement report to a positioning entity and the at least one assisting UE generates a second measurement report and sends the second measurement report to the positioning entity, wherein a position of the target UE is determined based at least on at least the first measurement report and the second measurement report.

Clause 2. The method of clause 1, wherein the position of the target UE is determined using Time Difference of Arrival (TDOA), and the first measurement report and the second measurement report comprise Reference Signal Time Difference (RSTD) measurements for the target UE generated based on a time of reception of the common SRS resource.

Clause 3. The method of any of clauses 1-2, wherein a position of the at least one assisting UE is known.

Clause 4. The method of any of clauses 1-2, wherein a position of an assisting UE is unknown, and wherein the position of the assisting UE is determined based at least on the first measurement report and the second measurement report.

Clause 5. The method of clause 4, further comprising: receiving a second common SRS resource broadcast by the assisting UE to the target UE and the at least one base station; and generating a third measurement report for the second common SRS resource, wherein the position of the target UE and the assisting UE are determined based at least on the first measurement report, the second measurement report, and the third measurement report.

Clause 6. The method of clause 5, wherein the at least one base station generates an angular measurement of one of the common SRS resource and the second common SRS resource and sends the angular measurement to the positioning entity, wherein the positions of the target UE and the assisting UE are determined further based on the angular measurement.

Clause 7. The method of any of clauses 1-6, further comprising: receiving a second common SRS resource from an assisting UE; and generating a third measurement report for the second common SRS resource, wherein the position of the target UE is determined based at least on the first measurement report, the second measurement report, and the third measurement report.

Clause 8. The method of any of clauses 1-7, wherein the positioning entity is a location server.

Clause 9. The method of any of clauses 1-7, wherein the positioning entity is the target UE.

Clause 10. A target user equipment (UE) configured for supporting positioning of the target UE, comprising: a wireless transceiver configured to communicate with entities in a wireless network; at least one memory; and at least one processor coupled to the wireless transceiver and the at least one memory, wherein the at least one processor is configured to: receive, via the wireless transceiver, a sounding reference signal (SRS) configuration for broadcasting a common SRS resource for positioning to at least one base station and at least one assisting UE, wherein the at least one assisting UE are configured with the SRS configuration to receive the common SRS resource; and broadcast, via the wireless transceiver, the common sounding reference signal (SRS) resource to each of the at least one base station and the at least one assisting UE, wherein the at least one base station generates a first measurement report and sends the first measurement report to a positioning entity and the at least one assisting UE generates a second measurement report and sends the second measurement report to the positioning entity, wherein a position of the target UE is determined based at least on at least the first measurement report and the second measurement report.

Clause 11. The target UE of clause 10, wherein the position of the target UE is determined using Time Difference of Arrival (TDOA), and the first measurement report and the second measurement report comprise Reference Signal Time Difference (RSTD) measurements for the target UE generated based on a time of reception of the common SRS resource.

Clause 12. The target UE of any of clauses 10-11, wherein a position of the at least one assisting UE is known.

Clause 13. The target UE of any of clauses 10-11, wherein a position of an assisting UE is unknown, and wherein the position of the assisting UE is determined based at least on the first measurement report and the second measurement report.

Clause 14. The target UE of clause 13, wherein the at least one processor is further configured to: receive, via the wireless transceiver, a second common SRS resource broadcast by the assisting UE to the target UE and the at least one base station; and generate a third measurement report for the second common SRS resource, wherein the position of the target UE and the assisting UE are determined based at least on the first measurement report, the second measurement report, and the third measurement report.

Clause 15. The target UE of clause 14, wherein the at least one base station generates an angular measurement of one of the common SRS resource and the second common SRS resource and sends the angular measurement to the positioning entity, wherein the positions of the target UE and the assisting UE are determined further based on the angular measurement.

Clause 16. The target UE of any of clauses 10-15, wherein the at least one processor is further configured to: receive, via the wireless transceiver, a second common SRS resource from an assisting UE; and generate a third measurement report for the second common SRS resource, wherein the position of the target UE is determined based at least on the first measurement report, the second measurement report, and the third measurement report.

Clause 17. The target UE of any of clauses 10-16, wherein the positioning entity is a location server.

Clause 18. The target UE of any of clauses 10-16, wherein the positioning entity is the target UE.

Clause 19. A target user equipment (UE) configured for supporting positioning of the target UE, comprising: means for receiving a sounding reference signal (SRS) configuration for broadcasting a common SRS resource for positioning to at least one base station and at least one assisting UE, wherein the at least one assisting UE are configured with the SRS configuration to receive the common SRS resource; and means for broadcasting the common sounding reference signal (SRS) resource to each of the at least one base station and the at least one assisting UE, wherein the at least one base station generates a first measurement report and sends the first measurement report to a positioning entity and the at least one assisting UE generates a second measurement report and sends the second measurement report to the positioning entity, wherein a position of the target UE is determined based at least on at least the first measurement report and the second measurement report.

Clause 20. The target UE of clause 19, wherein the position of the target UE is determined using Time Difference of Arrival (TDOA), and the first measurement report and the second measurement report comprise Reference Signal Time Difference (RSTD) measurements for the target UE generated based on a time of reception of the common SRS resource.

Clause 21. The target UE of any of clauses 19-20, wherein a position of the at least one assisting UE is known.

Clause 22. The target UE of any of clauses 19-20, wherein a position of an assisting UE is unknown, and wherein the position of the assisting UE is determined based at least on the first measurement report and the second measurement report.

Clause 23. The target UE of clause 22, further comprising: means for receiving a second common SRS resource broadcast by the assisting UE to the target UE and the at least one base station; and means for generating a third measurement report for the second common SRS resource, wherein the position of the target UE and the assisting UE are determined based at least on the first measurement report, the second measurement report, and the third measurement report.

Clause 24. The target UE of clause 23, wherein the at least one base station generates an angular measurement of one of the common SRS resource and the second common SRS resource and sends the angular measurement to the positioning entity, wherein the positions of the target UE and the assisting UE are determined further based on the angular measurement.

Clause 25. The target UE of any of clauses 19-24, further comprising: means for receiving a second common SRS resource from an assisting UE; and means for generating a third measurement report for the second common SRS resource, wherein the position of the target UE is determined based at least on the first measurement report, the second measurement report, and the third measurement report.

Clause 26. The target UE of any of clauses 19-25, wherein the positioning entity is a location server.

Clause 27. The target UE of any of clauses 19-25, wherein the positioning entity is the target UE.

Clause 28. A non-transitory storage medium including program code stored thereon, the program code is operable to configure at least one processor in a target user equipment (UE) for supporting positioning of the target UE, the program code comprising instructions to: receive a sounding reference signal (SRS) configuration for broadcasting a common SRS resource for positioning to at least one base station and at least one assisting UE, wherein the at least one assisting UE are configured with the SRS configuration to receive the common SRS resource; and broadcast the common sounding reference signal (SRS) resource to each of the at least one base station and the at least one assisting UE, wherein the at least one base station generates a first measurement report and sends the first measurement report to a positioning entity and the at least one assisting UE generates a second measurement report and sends the second measurement report to the positioning entity, wherein a position of the target UE is determined based at least on at least the first measurement report and the second measurement report.

Clause 29. The non-transitory storage medium of clause 28, wherein the position of the target UE is determined using Time Difference of Arrival (TDOA), and the first measurement report and the second measurement report comprise Reference Signal Time Difference (RSTD) measurements for the target UE generated based on a time of reception of the common SRS resource.

Clause 30. The non-transitory storage medium of any of clauses 28-29, wherein a position of the at least one assisting UE is known.

Clause 31. The non-transitory storage medium of any of clauses 28-29, wherein a position of an assisting UE is unknown, and wherein the position of the assisting UE is determined based at least on the first measurement report and the second measurement report.

Clause 32. The non-transitory storage medium of clause 31, wherein the program code further comprises instructions to: receive a second common SRS resource broadcast by the assisting UE to the target UE and the at least one base station; and generate a third measurement report for the second common SRS resource, wherein the position of the target UE and the assisting UE are determined based at least on the first measurement report, the second measurement report, and the third measurement report.

Clause 33. The non-transitory storage medium of clause 32, wherein the at least one base station generates an angular measurement of one of the common SRS resource and the second common SRS resource and sends the angular measurement to the positioning entity, wherein the positions of the target UE and the assisting UE are determined further based on the angular measurement.

Clause 34. The non-transitory storage medium of any of clauses 28-33, wherein the program code further comprises instructions to: receive a second common SRS resource from an assisting UE; and generate a third measurement report for the second common SRS resource, wherein the position of the target UE is determined based at least on the first measurement report, the second measurement report, and the third measurement report.

Clause 35. The non-transitory storage medium of any of clauses 28-34, wherein the positioning entity is a location server.

Clause 36. The non-transitory storage medium of any of clauses 28-34, the positioning entity is the target UE.

Clause 37. A method performed by a user equipment (UE) for supporting positioning of a target UE, comprising: receiving a common sounding reference signal (SRS) resource broadcast by the target UE for receipt by the UE and at least one base station; generating a first positioning measurement based on the common SRS resource; and reporting the first positioning measurement to a positioning entity.

Clause 38. The method of clause 37, wherein the at least one base station generates a second positioning measurement based on the common SRS resource and sends the second positioning measurement to the positioning entity, wherein the positioning entity determines a position of the target UE based on the first positioning measurement and the second positioning measurement.

Clause 39. The method of any of clauses 37-38, wherein a position of the target UE is determined using Time Difference of Arrival (TDOA), and the first positioning measurement comprises a Reference Signal Time Difference (RSTD) measurement for the target UE generated based on the common SRS resource.

Clause 40. The method of any of clauses 37-39, further comprising receiving assistance data for the common SRS resource, wherein the assistance data is used for receiving the common SRS resource.

Clause 41. The method of any of clauses 37-40, wherein a position of the UE is known.

Clause 42. The method of any of clauses 37-40, wherein a position of the UE is unknown, and wherein the position of the UE is determined based at least on the first positioning measurement.

Clause 43. The method of clause 42, further comprising: broadcasting a second common SRS resource to be received by the target UE and the at least one base station, wherein the first positioning measurement is based on the common SRS resource and the second common SRS resource.

Clause 44. The method of clause 43, wherein the at least one base station generates an angular measurement of one of the common SRS resource and the second common SRS resource and sends the angular measurement to the positioning entity, wherein the positions of the target UE and the UE are determined further based on the angular measurement.

Clause 45. The method of any of clauses 37-44, wherein the positioning entity is one of a location server and the target UE.

Clause 46. A user equipment (UE) configured for supporting positioning of a target UE, comprising: a wireless transceiver configured to communicate with entities in a wireless network; at least one memory; and at least one processor coupled to the wireless transceiver and the at least one memory, wherein the at least one processor is configured to: receive, via the wireless transceiver, a common sounding reference signal (SRS) resource broadcast by the target UE for receipt by the UE and at least one base station; generate a first positioning measurement based on the common SRS resource; and report, via the wireless transceiver, the first positioning measurement to a positioning entity.

Clause 47. The UE of clause 46, wherein the at least one base station generates a second positioning measurement based on the common SRS resource and sends the second positioning measurement to the positioning entity, wherein the positioning entity determines a position of the target UE based on the first positioning measurement and the second positioning measurement.

Clause 48. The UE of any of clauses 46-47, wherein a position of the target UE is determined using Time Difference of Arrival (TDOA), and the first positioning measurement comprises a Reference Signal Time Difference (RSTD) measurement for the target UE generated based on the common SRS resource.

Clause 49. The UE of any of clauses 46-48, the at least one processor is further configured to receive, via the wireless transceiver, assistance data for the common SRS resource, wherein the assistance data is used for receiving the common SRS resource.

Clause 50. The UE of any of clauses 46-49, wherein a position of the UE is known.

Clause 51. The UE of any of clauses 46-49, wherein a position of the UE is unknown, and wherein the position of the UE is determined based at least on the first positioning measurement.

Clause 52. The UE of clause 51, the at least one processor is further configured to: broadcast, via the wireless transceiver, a second common SRS resource to be received by the target UE and the at least one base station, wherein the first positioning measurement is based on the common SRS resource and the second common SRS resource.

Clause 53. The UE of clause 52, wherein the at least one base station generates an angular measurement of one of the common SRS resource and the second common SRS resource and sends the angular measurement to the positioning entity, wherein the positions of the target UE and the UE are determined further based on the angular measurement.

Clause 54. The UE of any of clauses 46-53, wherein the positioning entity is one of a location server and the target UE.

Clause 55. A user equipment (UE) configured for supporting positioning of a target UE, comprising: means for receiving a common sounding reference signal (SRS) resource broadcast by the target UE for receipt by the UE and at least one base station; means for generating a first positioning measurement based on the common SRS resource; and means for reporting the first positioning measurement to a positioning entity.

Clause 56. The UE of clause 55, wherein the at least one base station generates a second positioning measurement first positioning measurement based on the common SRS resource and sends the second positioning measurement first positioning measurement to the positioning entity, wherein the positioning entity determines a position of the target UE based on the first positioning measurement and the second positioning measurement first positioning measurement.

Clause 57. The UE of clause 55, wherein a position of the target UE is determined using Time Difference of Arrival (TDOA), and the first positioning measurement comprises a Reference Signal Time Difference (RSTD) measurement for the target UE generated based on the common SRS resource.

Clause 58. The UE of any of clauses 55-57, further comprising means for receiving assistance data for the common SRS resource, wherein the assistance data is used for receiving the common SRS resource.

Clause 59. The UE of any of clauses 55-58, wherein a position of the UE is known.

Clause 60. The UE of any of clauses 55-58, wherein a position of the UE is unknown, and wherein the position of the UE is determined based at least on the first positioning measurement.

Clause 61. The UE of clause 60, further comprising: means for broadcasting a second common SRS resource to be received by the target UE and the at least one base station, wherein the first positioning measurement is based on the common SRS resource and the second common SRS resource.

Clause 62. The UE of clause 61, wherein the at least one base station generates an angular measurement of one of the common SRS resource and the second common SRS resource and sends the angular measurement to the positioning entity, wherein the positions of the target UE and the UE are determined further based on the angular measurement.

Clause 63. The UE of any of clauses 55-62, wherein the positioning entity is one of a location server and the target UE.

Clause 64. A non-transitory storage medium including program code stored thereon, the program code is operable to configure at least one processor in a user equipment (UE) for supporting positioning of a target UE, the program code comprising instructions to: receive a common sounding reference signal (SRS) resource broadcast by the target UE for receipt by the UE and at least one base station; generate a first positioning measurement based on the common SRS resource; and report the first positioning measurement to a positioning entity.

Clause 65. The non-transitory storage medium of clause 64, wherein the at least one base station generates a second positioning measurement first positioning measurement based on the common SRS resource and sends the second positioning measurement first positioning measurement to the positioning entity, wherein the positioning entity determines a position of the target UE based on the first positioning measurement and the second positioning measurement first positioning measurement.

Clause 66. The non-transitory storage medium of any of clauses 64-65, wherein a position of the target UE is determined using Time Difference of Arrival (TDOA), and the first positioning measurement comprises a Reference Signal Time Difference (RSTD) measurement for the target UE generated based on the common SRS resource.

Clause 67. The non-transitory storage medium of any of clauses 64-66, the program code further comprises instructions to receive assistance data for the common SRS resource, wherein the assistance data is used for receiving the common SRS resource.

Clause 68. The non-transitory storage medium of any of clauses 64-67, wherein a position of the UE is known.

Clause 69. The non-transitory storage medium of any of clauses 64-67, wherein a position of the UE is unknown, and wherein the position of the UE is determined based at least on the first positioning measurement.

Clause 70. The non-transitory storage medium of clause 69, the program code further comprises instructions to: broadcast a second common SRS resource to be received by the target UE and the at least one base station, wherein the first positioning measurement is based on the common SRS resource and the second common SRS resource.

Clause 71. The non-transitory storage medium of clause 70, wherein the at least one base station generates an angular measurement of one of the common SRS resource and the second common SRS resource and sends the angular measurement to the positioning entity, wherein the positions of the target UE and the UE are determined further based on the angular measurement.

Clause 72. The non-transitory storage medium of any of clauses 64-71, wherein the positioning entity is one of a location server and the target UE.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method performed by a target user equipment (UE) for supporting positioning of the target UE, comprising:
   receiving a sounding reference signal (SRS) configuration for broadcasting a common SRS resource for positioning to at least one base station and at least one assisting UE, wherein the at least one assisting UE are configured with the SRS configuration to receive the common SRS resource; and
   broadcasting the common sounding reference signal (SRS) resource to each of the at least one base station and the at least one assisting UE, wherein the at least one base station generates a first measurement report and sends the first measurement report to a positioning entity and the at least one assisting UE generates a second measurement report and sends the second measurement report to the positioning entity, wherein a position of the target UE is determined based at least on at least the first measurement report and the second measurement report.

2. The method of claim 1, wherein the position of the target UE is determined using Time Difference of Arrival (TDOA), and the first measurement report and the second measurement report comprise Reference Signal Time Difference (RSTD) measurements for the target UE generated based on a time of reception of the common SRS resource.

3. The method of claim 1, wherein a position of the at least one assisting UE is known.

4. The method of claim 1, wherein a position of an assisting UE is unknown, and wherein the position of the assisting UE is determined based at least on the first measurement report and the second measurement report.

5. The method of claim 4, further comprising:
   receiving a second common SRS resource broadcast by the assisting UE to the target UE and the at least one base station; and
   generating a third measurement report for the second common SRS resource, wherein the position of the target UE and the assisting UE are determined based at least on the first measurement report, the second measurement report, and the third measurement report.

6. The method of claim 5, wherein the at least one base station generates an angular measurement of one of the common SRS resource and the second common SRS resource and sends the angular measurement to the positioning entity, wherein the positions of the target UE and the assisting UE are determined further based on the angular measurement.

7. The method of claim 1, further comprising:
   receiving a second common SRS resource from an assisting UE; and
   generating a third measurement report for the second common SRS resource, wherein the position of the target UE is determined based at least on the first measurement report, the second measurement report, and the third measurement report.

8. The method of claim 1, wherein the positioning entity is a location server.

9. The method of claim 1, wherein the positioning entity is the target UE.

10. A target user equipment (UE) configured for supporting positioning of the target UE, comprising:
    a wireless transceiver configured to communicate with entities in a wireless network;
    at least one memory; and
    at least one processor coupled to the wireless transceiver and the at least one memory, wherein the at least one processor is configured to:
    receive, via the wireless transceiver, a sounding reference signal (SRS) configuration for broadcasting a common SRS resource for positioning to at least one base station and at least one assisting UE, wherein the at least one assisting UE are configured with the SRS configuration to receive the common SRS resource; and
    broadcast, via the wireless transceiver, the common sounding reference signal (SRS) resource to each of the at least one base station and the at least one assisting UE, wherein the at least one base station generates a first measurement report and sends the first measurement report to a positioning entity and the at least one assisting UE generates a second measurement report and sends the second measurement report to the positioning entity, wherein a position of the target UE is determined based at least on at least the first measurement report and the second measurement report.

11. The target UE of claim 10, wherein the position of the target UE is determined using Time Difference of Arrival (TDOA), and the first measurement report and the second measurement report comprise Reference Signal Time Difference (RSTD) measurements for the target UE generated based on a time of reception of the common SRS resource.

12. The target UE of claim 10, wherein a position of the at least one assisting UE is known.

13. The target UE of claim 10, wherein a position of an assisting UE is unknown, and wherein the position of the assisting UE is determined based at least on the first measurement report and the second measurement report.

14. The target UE of claim 13, wherein the at least one processor is further configured to:
receive, via the wireless transceiver, a second common SRS resource broadcast by the assisting UE to the target UE and the at least one base station; and
generate a third measurement report for the second common SRS resource, wherein the position of the target UE and the assisting UE are determined based at least on the first measurement report, the second measurement report, and the third measurement report.

15. The target UE of claim 14, wherein the at least one base station generates an angular measurement of one of the common SRS resource and the second common SRS resource and sends the angular measurement to the positioning entity, wherein the positions of the target UE and the assisting UE are determined further based on the angular measurement.

16. The target UE of claim 10, wherein the at least one processor is further configured to:
receive, via the wireless transceiver, a second common SRS resource from an assisting UE; and
generate a third measurement report for the second common SRS resource, wherein the position of the target UE is determined based at least on the first measurement report, the second measurement report, and the third measurement report.

17. The target UE of claim 10, wherein the positioning entity is a location server.

18. The target UE of claim 10, wherein the positioning entity is the target UE.

19. A method performed by a user equipment (UE) for supporting positioning of a target UE, comprising:
receiving a common sounding reference signal (SRS) resource broadcast by the target UE for receipt by the UE and at least one base station;
generating a first positioning measurement based on the common SRS resource; and
reporting the first positioning measurement to a positioning entity, wherein the at least one base station generates a second positioning measurement based on the common SRS resource and sends the second positioning measurement to the positioning entity, wherein the positioning entity determines a position of the target UE based on the first positioning measurement and the second positioning measurement.

20. The method of claim 19, wherein a position of the target UE is determined using Time Difference of Arrival (TDOA), and the first positioning measurement comprises a Reference Signal Time Difference (RSTD) measurement for the target UE generated based on the common SRS resource.

21. The method of claim 19, further comprising receiving assistance data for the common SRS resource, wherein the assistance data is used for receiving the common SRS resource.

22. The method of claim 19, wherein a position of the UE is known.

23. The method of claim 19, wherein a position of the UE is unknown, and wherein the position of the UE is determined based at least on the first positioning measurement.

24. The method of claim 23, further comprising:
broadcasting a second common SRS resource to be received by the target UE and the at least one base station, wherein the first positioning measurement is based on the common SRS resource and the second common SRS resource.

25. The method of claim 24, wherein the at least one base station generates an angular measurement of one of the common SRS resource and the second common SRS resource and sends the angular measurement to the positioning entity, wherein the positions of the target UE and the UE are determined further based on the angular measurement.

26. The method of claim 19, wherein the positioning entity is one of a location server and the target UE.

27. A user equipment (UE) configured for supporting positioning of a target UE, comprising:
a wireless transceiver configured to communicate with entities in a wireless network;
at least one memory; and
at least one processor coupled to the wireless transceiver and the at least one memory, wherein the at least one processor is configured to:
receive, via the wireless transceiver, a common sounding reference signal (SRS) resource broadcast by the target UE for receipt by the UE and at least one base station;
generate a first positioning measurement based on the common SRS resource; and
report, via the wireless transceiver, the first positioning measurement to a positioning entity, wherein the at least one base station generates a second positioning measurement based on the common SRS resource and sends the second positioning measurement to the positioning entity, wherein the positioning entity determines a position of the target UE based on the first positioning measurement and the second positioning measurement.

28. The UE of claim 27, wherein a position of the target UE is determined using Time Difference of Arrival (TDOA), and the first positioning measurement comprises a Reference Signal Time Difference (RSTD) measurement for the target UE generated based on the common SRS resource.

29. The UE of claim 27, the at least one processor is further configured to receive, via the wireless transceiver, assistance data for the common SRS resource, wherein the assistance data is used for receiving the common SRS resource.

30. The UE of claim 27, wherein a position of the UE is known.

31. The UE of claim 27, wherein a position of the UE is unknown, and wherein the position of the UE is determined based at least on the first positioning measurement.

32. The UE of claim 31, the at least one processor is further configured to:
broadcast, via the wireless transceiver, a second common SRS resource to be received by the target UE and the at least one base station, wherein the first positioning measurement is based on the common SRS resource and the second common SRS resource.

33. The UE of claim 32, wherein the at least one base station generates an angular measurement of one of the common SRS resource and the second common SRS resource and sends the angular measurement to the positioning entity, wherein the positions of the target UE and the UE are determined further based on the angular measurement.

34. The UE of claim 27, wherein the positioning entity is one of a location server and the target UE.

* * * * *